United States Patent [19]

Ikeda et al.

[11] Patent Number: 6,067,284
[45] Date of Patent: May 23, 2000

[54] RECORDING POWER ADJUSTMENT FOR OPTICAL STORAGE APPARATUS

[75] Inventors: Toru Ikeda; Shigenori Yanagi, both of Kawasaki, Japan

[73] Assignee: Fujitsu Limited, Kawasaki, Japan

[21] Appl. No.: 08/961,444

[22] Filed: Oct. 30, 1997

[30] Foreign Application Priority Data

Jun. 24, 1997 [JP] Japan .................................. 9-166943

[51] Int. Cl.⁷ ...................................................... G11B 7/00
[52] U.S. Cl. ............................................. 369/116; 369/54
[58] Field of Search ................................. 369/47, 48, 54, 369/58, 116, 124

[56] References Cited

FOREIGN PATENT DOCUMENTS

| | | |
|---|---|---|
| 400726 | 12/1990 | European Pat. Off. . |
| 60-247828 | 12/1985 | Japan . |
| 62-222438 | 9/1987 | Japan . |
| 01037745 | 2/1989 | Japan . |
| 01220178 | 9/1989 | Japan . |
| 02012617 | 1/1990 | Japan . |
| 02230516 | 9/1990 | Japan . |
| 07014107 | 1/1995 | Japan . |
| 08007311 | 1/1996 | Japan . |

*Primary Examiner*—Paul W. Huber
*Attorney, Agent, or Firm*—Greer, Burns & Crain, Ltd.

[57] ABSTRACT

After a first test pattern and a second test pattern were sequentially test written to at least two adjacent tracks by a light emission driving of a laser diode, the adjacent track in which the first test pattern was first test written is reproduced, thereby checking the presence or absence of a data error. When there is the data error, the test writing is repeated while changing a light emitting power until the data error is eliminated. When there is no data error, the light emitting power used in the test writing is set to a recording power.

50 Claims, 27 Drawing Sheets

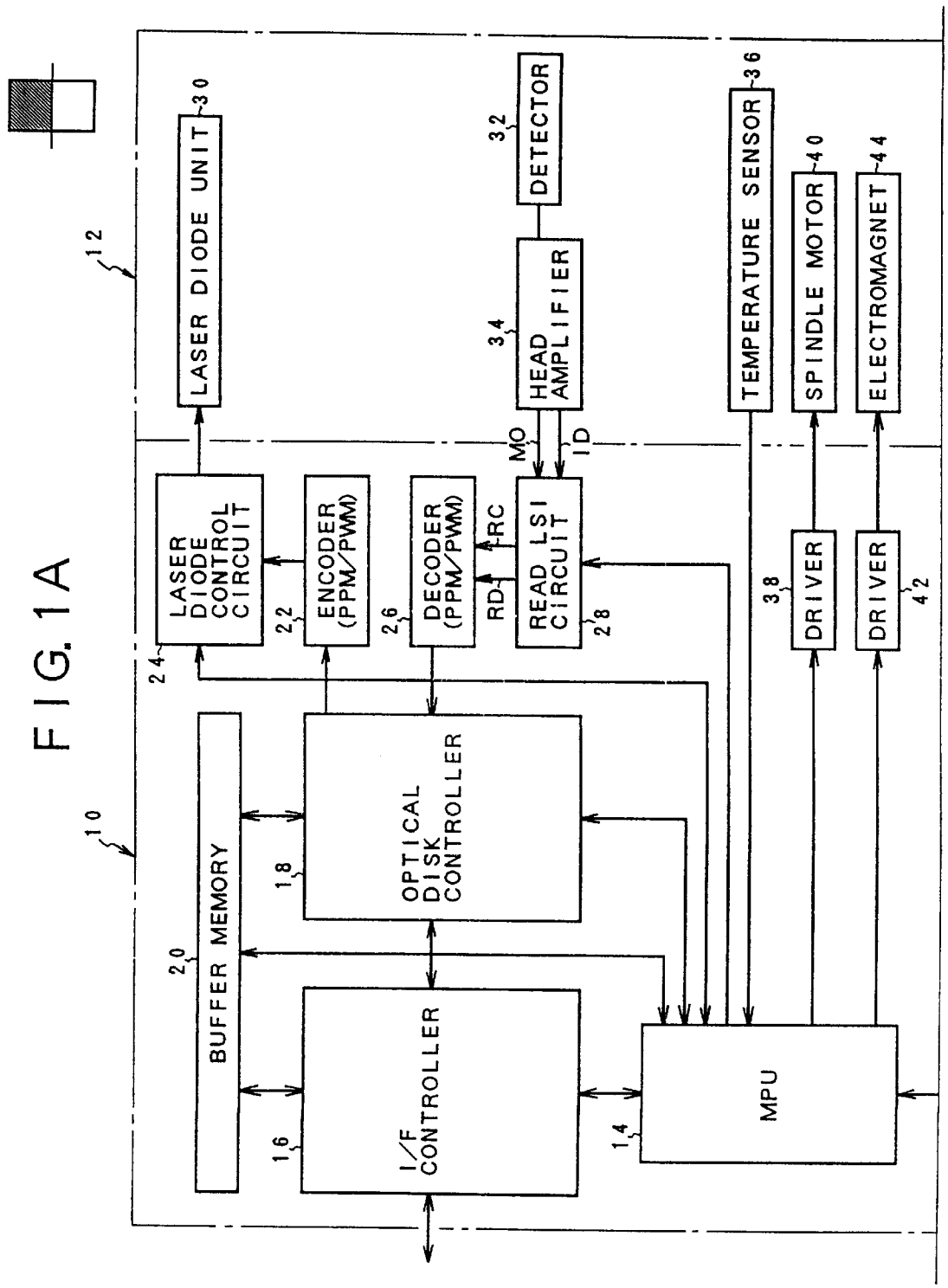

FIG. 4A WRITE GATE 
FIG. 4B WRITE DATA 
FIG. 4C WRITE CLOCK 
FIG. 4D PULSE WIDTH DATA 
FIG. 4E ASSIST PULSE 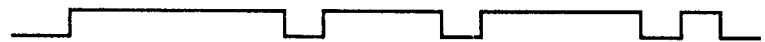
FIG. 4F FIRST WRITE PULSE 
FIG. 4G SECOND WRITE PULSE 
FIG. 4H LIGHT EMISSION CURRENT/POWER 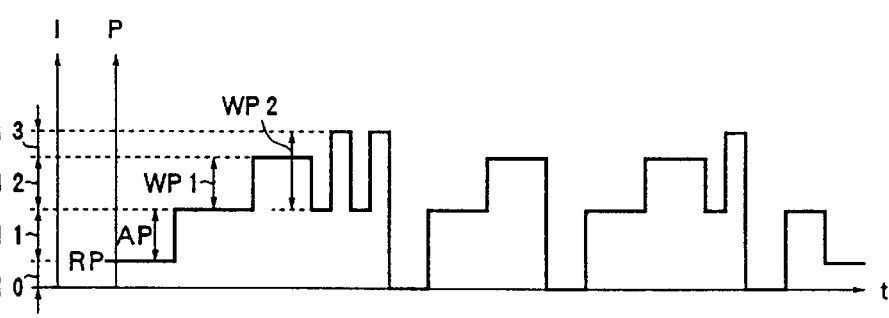
FIG. 4I SUBTRACTION CURRENT 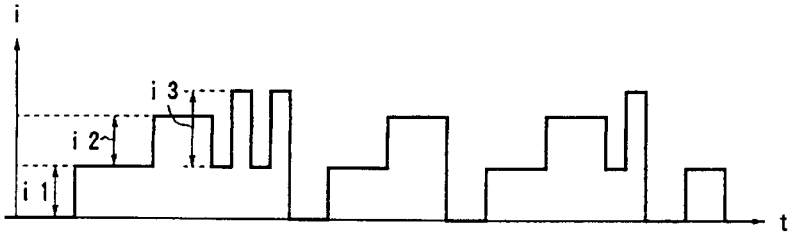
FIG. 4J MONITOR CURRENT im (i0−(i1+i2+i3)) 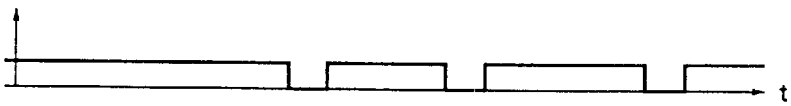

FIG. 5A WRITE GATE 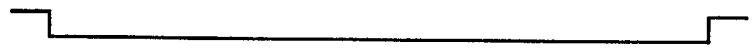
FIG. 5B WRITE DATA 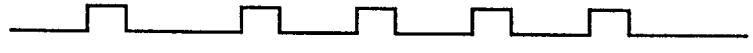
FIG. 5C WRITE CLOCK 
FIG. 5D PULSE WIDTH DATA 
FIG. 5E ASSIST PULSE 
FIG. 5F FIRST WRITE PULSE 
FIG. 5G SECOND WRITE PULSE 
FIG. 5H LIGHT EMISSION CURRENT 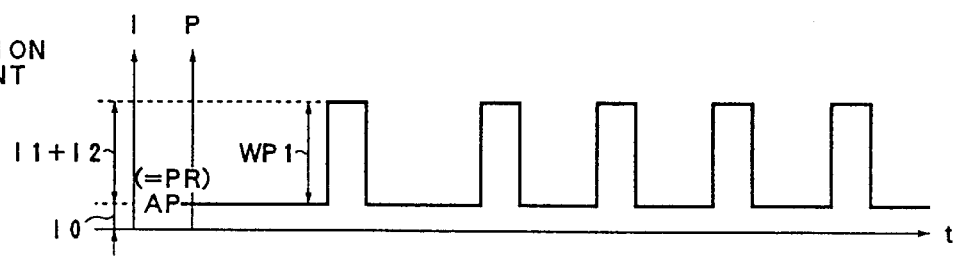
FIG. 5I SUBTRACTION CURRENT 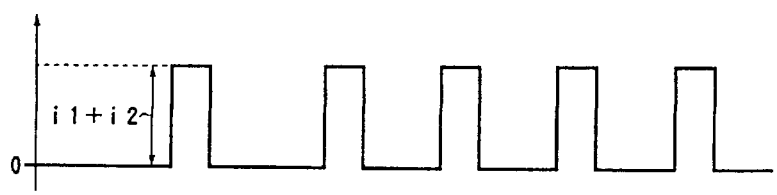
FIG. 5J MONITOR CURRENT im (=i0−(i1+i2)) 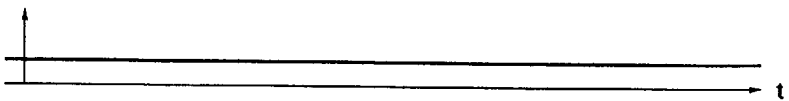

| ZONE No. i | DEPi |
|---|---|
| 1 | 3.0 mW |
| 2 | 3.2 mW |
| 3 | 3.3 mW |
| 4 | 3.4 mW |
| 5 | 3.7 mW |
| 6 | 3.8 mW |
| 7 | 3.9 mW |
| 8 | 4.1 mW |
| 9 | 4.2 mW |
| 10 | 4.4 mW |
| 11 | 4.5 mW |

| ZONE No. i | DWP i |
|---|---|
| 1 | 6. 0 mW |
| 2 | 6. 5 mW |
| 3 | 7. 0 mW |
| 4 | 7. 5 mW |
| 5 | 8. 0 mW |
| 6 | 8. 5 mW |
| 7 | 9. 0 mW |
| 8 | 9. 5 mW |
| 9 | 1 0. 0 mW |
| 1 0 | 1 0. 5 mW |
| 1 1 | 1 1. 0 mW |

| ZONE No. i | Kt |
|---|---|
| 1 | −0.10 |
| 2 | −0.08 |
| 3 | −0.06 |
| 4 | −0.04 |
| 5 | −0.02 |
| 6 | 0.00 |
| 7 | 0.02 |
| 8 | 0.04 |
| 9 | 0.06 |
| 10 | 0.08 |
| 11 | 0.10 |

216

FIG. 12A
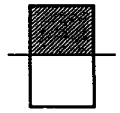
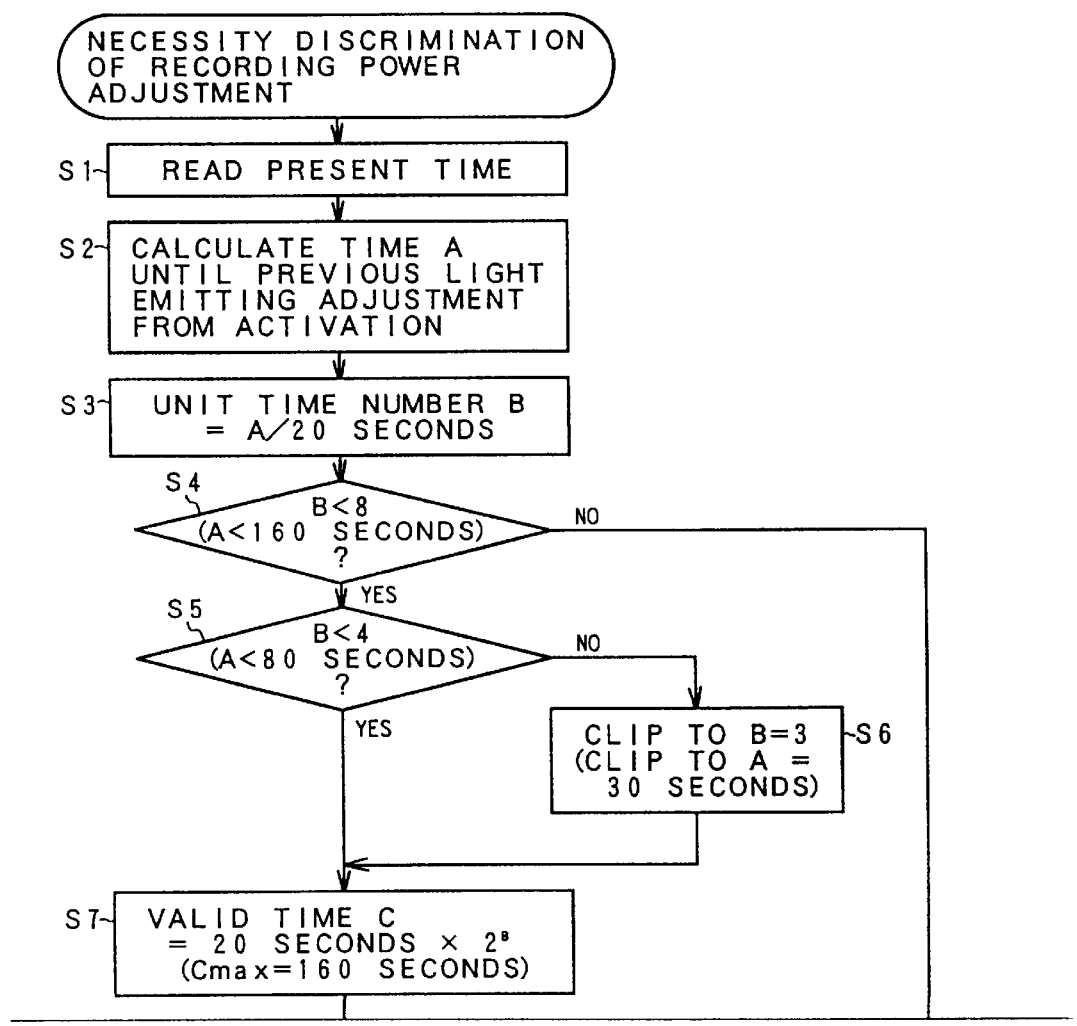

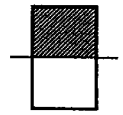
FIG. 13A
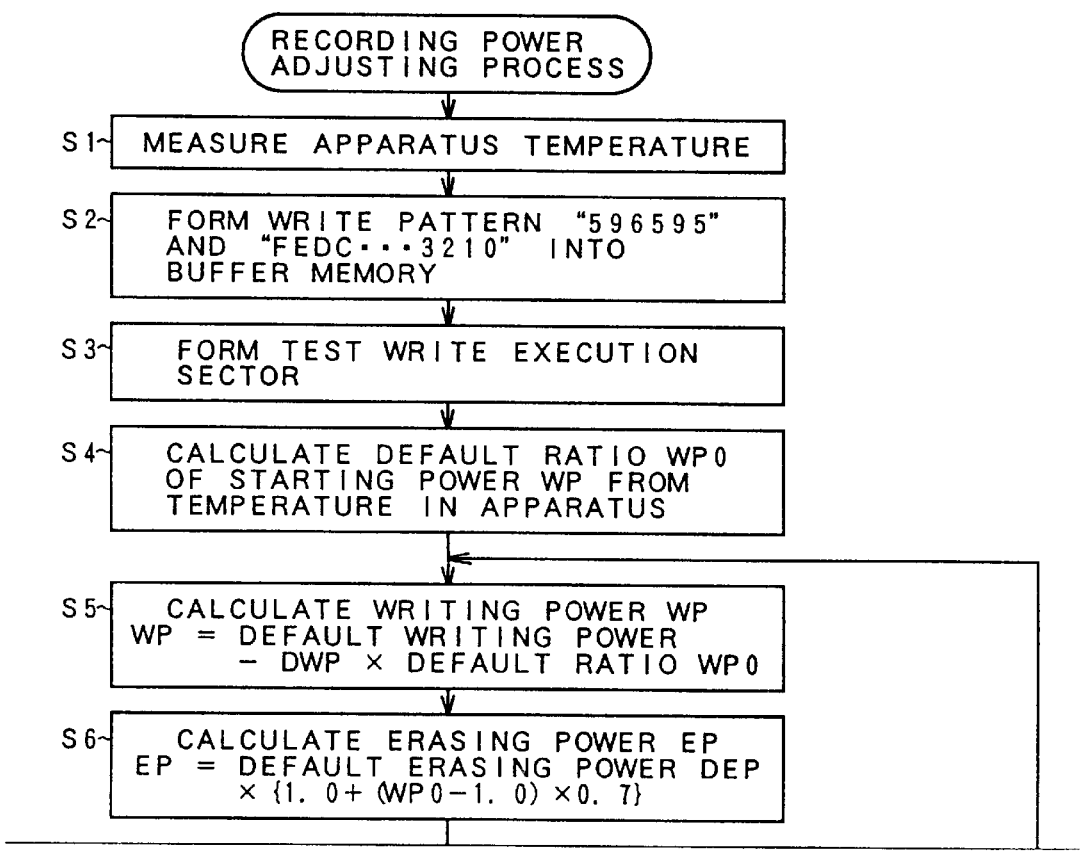

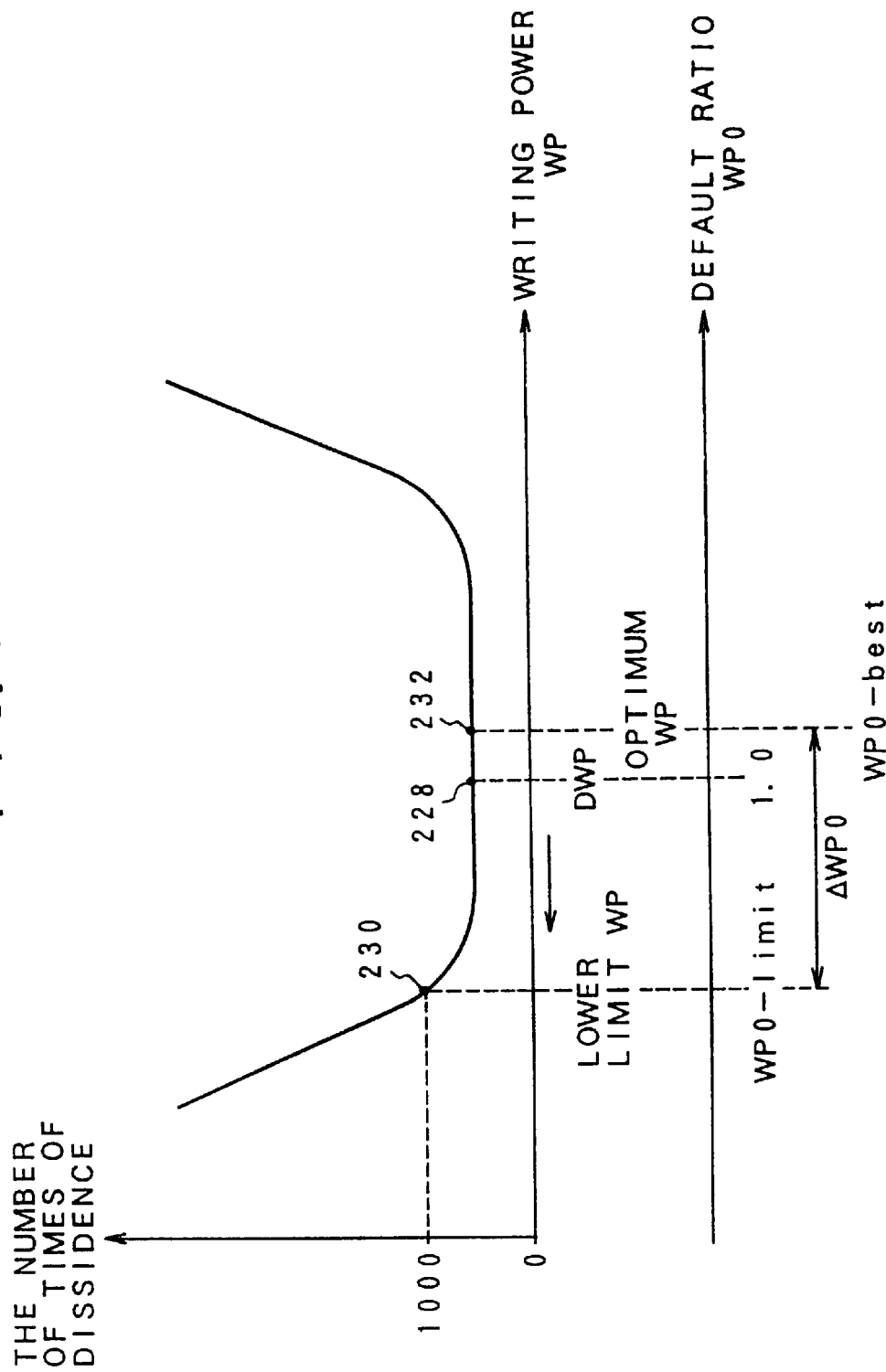

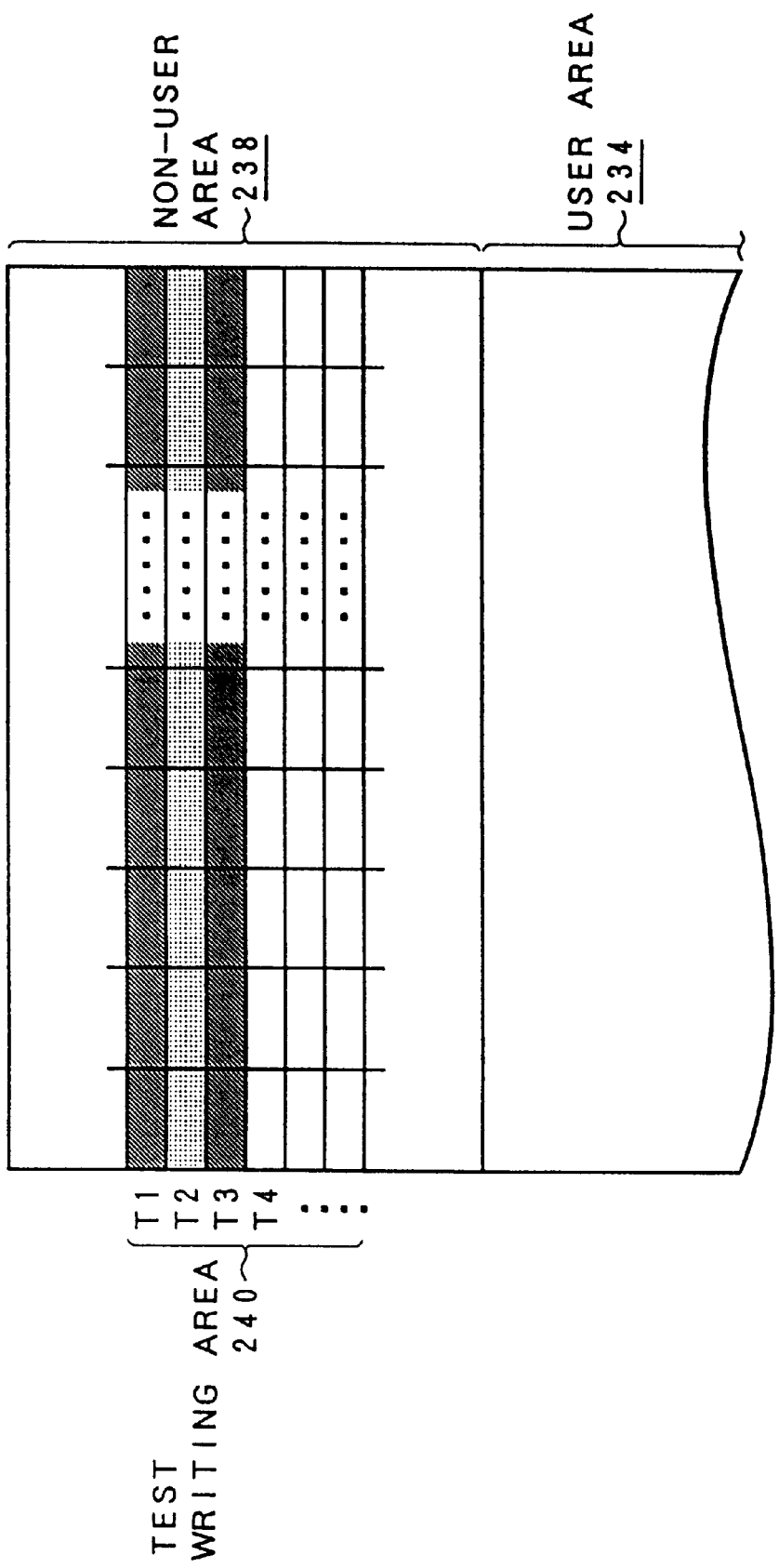

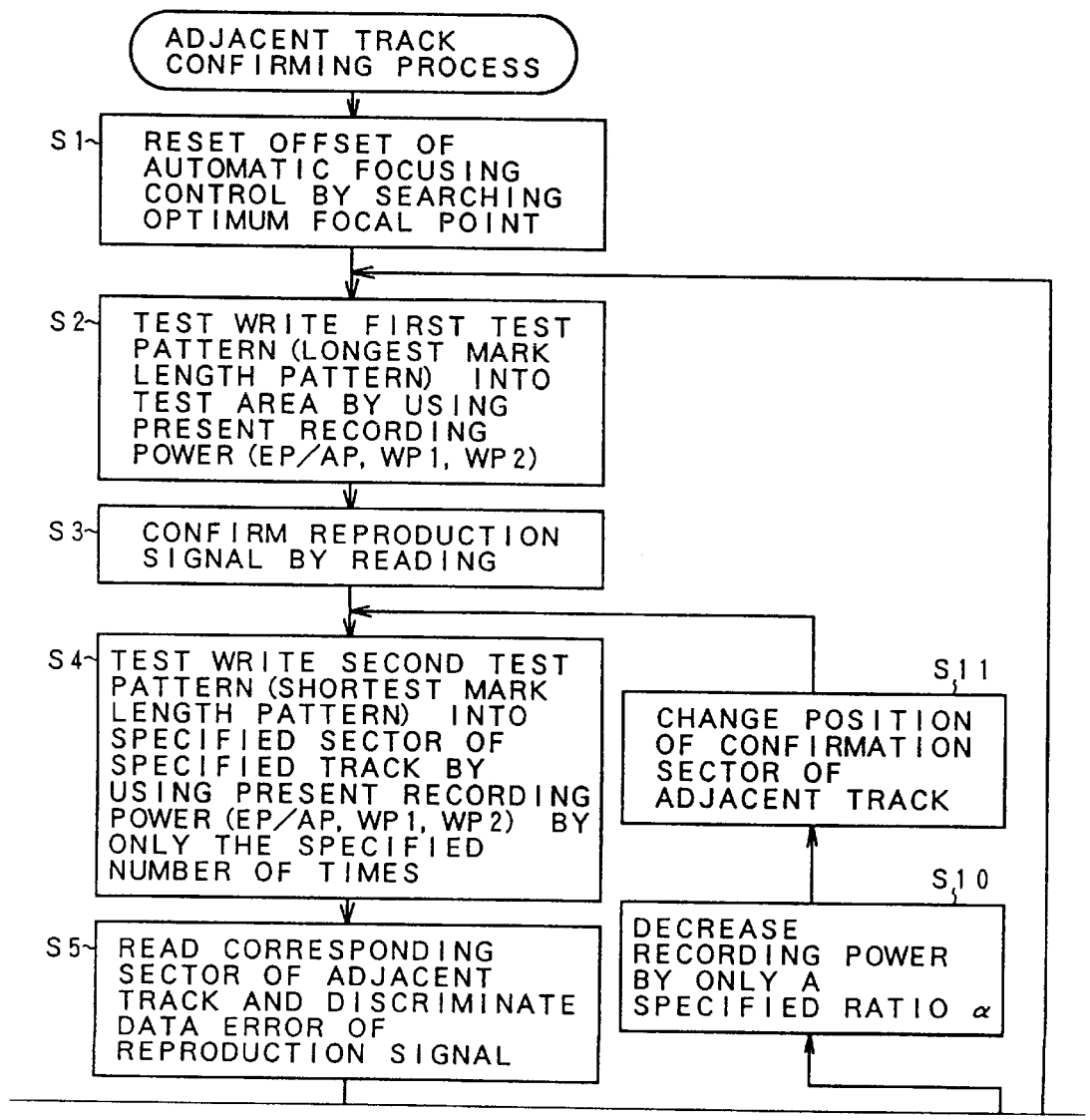

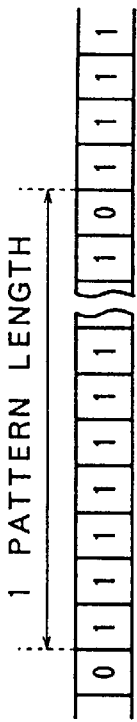
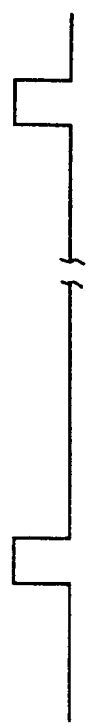
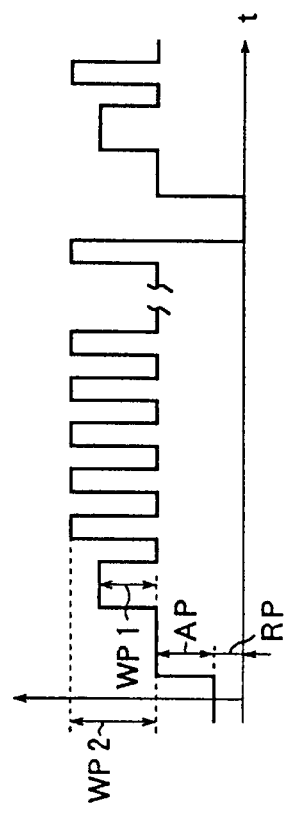
FIG. 20A WRITE DATA
FIG. 20B PWM DATA (MAXIMUM MARK LENGTH PATTERN)
FIG. 20C FIRST WRITE PULSE
FIG. 20D SECOND WRITE PULSE
FIG. 20E LIGHT EMITTING POWER

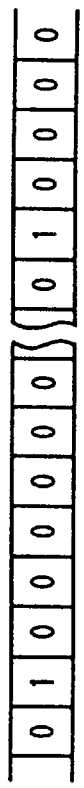
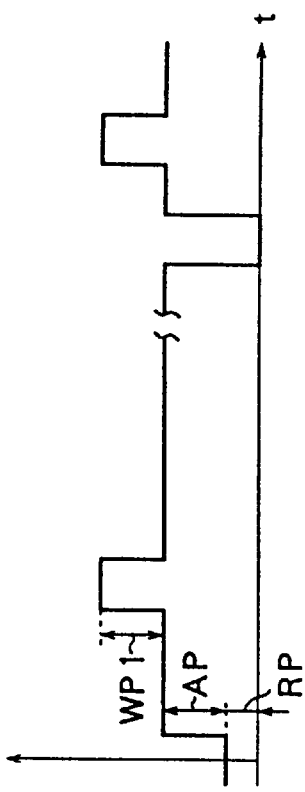
F I G. 21A  WRITE DATA
F I G. 21B  PWM DATA (MINIMUM MARK LENGTH PATTERN)
F I G. 21C  FIRST WRITE PULSE
F I G. 21D  SECOND WRITE PULSE
F I G. 21E  LIGHT EMITTING POWER

RECORDING POWER ADJUSTMENT FOR OPTICAL STORAGE APPARATUS

BACKGROUND OF THE INVENTION

The invention relates to an optical storage apparatus using a removable medium such as an MO cartridge or the like and, more particularly, to an optical storage apparatus for efficiently adjusting a light emitting power of a laser diode to an optimum power when a medium is loaded.

Attention is paid to an optical disk as a storage medium serving as a core of multimedia which is rapidly developing in recent years. When considering an MO cartridge of 3.5 inches as an example, media of a high density recording of 540 MB and 640 MB have been provided in recent years in addition to the conventional media of 128 MB and 230 MB. Therefore, it is desirable in an optical disk drive that all of the media of 180 MB, 230 MB, 540 MB, and 640 MB which are available at present can be used. In the MO cartridge which is used in the optical disk drive, a ZCAV recording (zone constant angular velocity recording) in which a medium track is divided into zones and the number of sectors in each zone is set to be equal is used. The number of zones of the MO medium is equal to 1 zone in case of the conventional medium of 128 MB and 10 zones in case of the medium of 230 MB. In case of the media of 640 MB and 540 MB which have been put into practical use in recent years, the numbers of zones are equal to 11 zones and 18 zones, respectively.

A recording method of the conventional media of 128 MB and 230 MB is a pit position modulation (PPM). In the PPM recording, a light emitting power is changed at three stages of a reading power, an erasing power, and a recording power. As compared with those media, a recording method of the media of 540 MB and 640 MB is a pulse width modulation (PWM). The PWM recording is also called a pulse train recording. In the PWM recording, the light emitting power is changed at four stages of the reading power, erasing power, and first and second writing powers. In case of the PWM recording for a medium of a direct overwrite correspondence type, since it is unnecessary to erase, the light emitting power is changed at four stages of the reading power, assisting power, first writing power, and second writing power. The assisting power gives a specified power for raising a response speed of a medium heating to write by the first or second writing power.

Ordinarily, in case of a removable optical disk medium enclosed in the cartridge, since an optimum recording power differs every medium, a light emitting adjustment such that when the medium is loaded, a test writing is performed every zone and the power is adjusted to the optimum recording power is executed. However, when a pitch between tracks is narrowed in order to realize a high density of the optical disk medium, a heat conduction easily occurs in an adjacent track. Consequently, even if the optimum recording power is determined by performing the test writing by a laser diode, although the recording can be properly executed to a target track, there is considered a possibility of occurrence of problems such that data on the adjacent track is erased, data of the adjacent track leaks, and the like.

SUMMARY OF THE INVENTION

According to the invention, there is provided an optical storage apparatus which can set an optimum recording power without causing a data error due to a leakage to an adjacent track upon recording.

According to an optical storage apparatus of the invention, a laser diode for emitting a light beam is provided, a first test pattern and a second test pattern are sequentially test written to at least two adjacent tracks by a light emission driving of the laser diode by a predetermined light emitting power by an adjacent track confirming unit and after that, the presence or absence of a data error is checked by first reproducing the adjacent track on which the first test pattern was test written, and when there is no data error, the light emitting power used for the test writing is set to a recording power. According to a modification of the invention, it is also possible to construct in a manner such that the first test pattern is test written to a center track among at least three adjacent tracks and the second test pattern is sequentially test written to the two tracks on both sides by the light emission driving of the laser diode by a predetermined light emitting power by the adjacent track confirming unit and, after that, the presence or absence of a data error is checked by reproducing the adjacent track on which the first test pattern was first test written, and when there is no data error, the light emitting power used for the test writing is set to a recording power.

According to the optical storage apparatus of the invention as mentioned above, after the recording power was determined, the test writing is performed by the determined recording power, and only when it is confirmed that there is no data error of the adjacent track, the determined recording power is set as an effective recording power to be used for an actual medium recording. Even in case of a medium in which a high density is realized by narrowing a track interval, an optimum recording can be realized without causing an error in data of the adjacent track due to the set recording power or receiving a leakage of data from the adjacent track.

The adjacent track confirming unit first executes the test writing to a test writing area by the first test pattern, executes the test writing to the same position of a specified track in the area by the second test pattern only a predetermined number of times, and after that, reproduces the adjacent track position on which the first test pattern was first test written, and checks for a data error. The adjacent track confirming unit confirms the presence or absence of a data error in the adjacent track by the test writing in a part of a user unused area which exists in the innermost or outermost rim of the medium. Therefore, even if the test writing to determine the optimum power is executed, user data is guaranteed. Further, there is provided a recording power adjusting unit for deciding the optimum recording power by adjusting the light emitting power of the light emitting diode, thereby determining a recording power initial value to be used for the test writing of the adjacent track confirming unit. The adjacent track confirming unit can perform the test writing by using the optimum recording power decided by the recording power adjusting unit as an initial value or can also execute the test writing by using a recording power that is slightly higher than the optimum recording power as an initial value. The recording power adjusting unit adjusts the light emitting power of the light emitting diode and determines the optimum recording power while executing the test writing to the medium. That is, the recording power adjusting unit test writes a predetermined test pattern to the medium while gradually decreasing the recording power of the laser diode step by step and, after that, reproduces and compares the written test pattern with the original test pattern, counts the number of times of dissidence of data, detects the recording power at which the number of times of dissidence exceeds a predetermined threshold value as a lower limit recording power, and decides a value obtained by adding a predetermined offset to the lower limit recording power as an optimum recording power. When the reproduction and confirmation of the adjacent track is normally finished, the adjacent track confirming unit initialization records (erases) the test writing area. As a discriminating condition of the data error of the adjacent track, the adjacent track confirming unit uses any one of the following conditions.

I. When it is detected that a level change of a peak detection signal of an RF signal reproduced from the adjacent track is equal to or larger than a specified value, it is determined that there is a data error.

II. The recording data and reproduction data of the adjacent track are compared and when it is detected that the number of bit errors increases to a specified value or more, it is decided that there is a data error.

III. When it is detected that the number of corrected ECC errors for the reproduction data of the adjacent track increases to a specified value or more, it is determined that there is a data error.

When the data error of the adjacent track by the test writing is confirmed, the adjacent track confirming unit repeats the test writing while gradually decreasing the power up to a predetermined lower limit recording power and obtains a recording power at which data of the adjacent track doesn't cause an error. In this case, the adjacent track confirming unit confirms the presence or absence of a data error of the adjacent track by the test writing of the second and subsequent times while changing the position on the medium. When data of the adjacent track causes an error even if the test writing is repeated by gradually decreasing the recording power up to the lower limit recording power, the adjacent track confirming unit retries the processes for obtaining the recording power by the test writing at a different position of the medium from the beginning. In this instance, the adjacent track confirming unit searches an optimum focal point, optimizes an offset value (target value) of an automatic focusing control, and after that, retries the processes.

The optimum focal point is searched by any one of the following methods.

I. When an objective lens position is adjusted, an offset value to provide a lens position at which a tracking error signal detected from a medium return light is maximum is set to the optimum focal point.

II. When the objective lens position is adjusted, an offset value to provide a lens position at which an RF reproduction signal detected from the medium return light is maximum is set to the optimum focal point.

III. When the objective lens position is adjusted, an offset value to provide a lens position at which a sum signal of a 4-split detector for converting the medium return light to electric signals is maximum is set to the optimum focal point.

The adjacent track confirming unit first test writes a longest mark length pattern as a first test pattern to all tracks in the test writing area of the medium. When the test writing of the longest mark length pattern to all of the tracks in the test writing area is completed, the adjacent track confirming unit designates a specified sector of a track T1, test writes a shortest mark length pattern as a second test pattern a specified number of times, and after that, reproduces the longest mark length recording pattern of the adjacent sector, thereby discriminating the presence or absence of a data error. It is also possible to construct in a manner such that, in place of the shortest mark length pattern, a DC light emission pattern in which the highest power on the apparatus operation is set to an initial value is used as a second test pattern, the test writing is performed a specified number of times, and after that, the longest mark length recording pattern of the adjacent track is reproduced, thereby discriminating the presence or absence of a data error. By test writing the longest mark length pattern and the shortest mark length pattern having a small correlation to two adjacent tracks, the presence or absence of the data error in the adjacent track can be efficiently checked by a small amount of data. Set timings of the recording power by the test writing by the adjacent track confirming unit are as follows.

I. Since the optimum recording power of the medium is changed depending on the apparatus temperature, when an environmental temperature change of the apparatus is equal to or larger than a specified value, the test writing is performed and the recording power is reset.

II. Since there is a probability that the optimum recording power is deviated in association with the increase in using time of the apparatus, an elapsed time from the previous test writing is monitored, the test writing is again performed after the elapse of a predetermined test write valid time, and the recording power is reset.

III. In order to cope with a case where an error such as an overtime or the like occurs for an access from an upper apparatus, the test writing is executed by a command instruction from the upper apparatus and the recording power is reset.

Further, when the adjustment of the recording power is executed at the timing of I, II, or III, the adjacent track confirming unit resets the recording power by the test writing while changing the position of the medium to be test written every time.

The above and other objects, features, and advantages of the present invention will become more apparent from the following detailed description with reference to the drawings.

BRIEF DESCRIPTION OF THE DRAWINGS

FIGS. 1A and 1B are block diagrams of an optical disk drive according to the invention;

FIGS. 4A to 4J are time charts for a signal, a light emission current, a subtraction current, and a monitor current by a PWM recording of the invention of a direct overwrite corresponding medium;

FIGS. 5A to 5J are time charts for a signal, a light emission current, a subtraction current, and a monitor current by a PPM recording of the invention of the direct overwrite corresponding medium;

FIG. 8 is an explanatory diagram of a default writing power table in FIG. 7;

FIG. 9 is an explanatory diagram of a temperature correction coefficient table in FIGS. 6A and 6B;

FIGS. 12A and 12B are flowcharts for a necessity discrimination of a recording power adjustment in FIGS. 6A and 6B;

FIGS. 13A and 13B are flowcharts for the recording power adjusting process in FIGS. 6A and 6B by a test writing;

FIG. 14 is an explanatory diagram for a detection of a limit power and a setting of an optimum power in FIGS. 13A and 13B;

FIGS. 18A and 18B are explanatory diagrams of a test writing area allocated to a non-user area in FIG. 17;

FIGS. 19A and 19B are flowcharts for an adjacent track confirming process in FIGS. 6A and 6B;

FIGS. 20A to 20E are time charts for a first test pattern which is used in the adjacent track confirming process;

FIGS. 21A to 21E are time charts for a second test pattern which is used in the adjacent track confirming process.

DETAILED DESCRIPTION OF THE PREFERRED EMBODIMENT

[Apparatus construction]

Figure 1B:
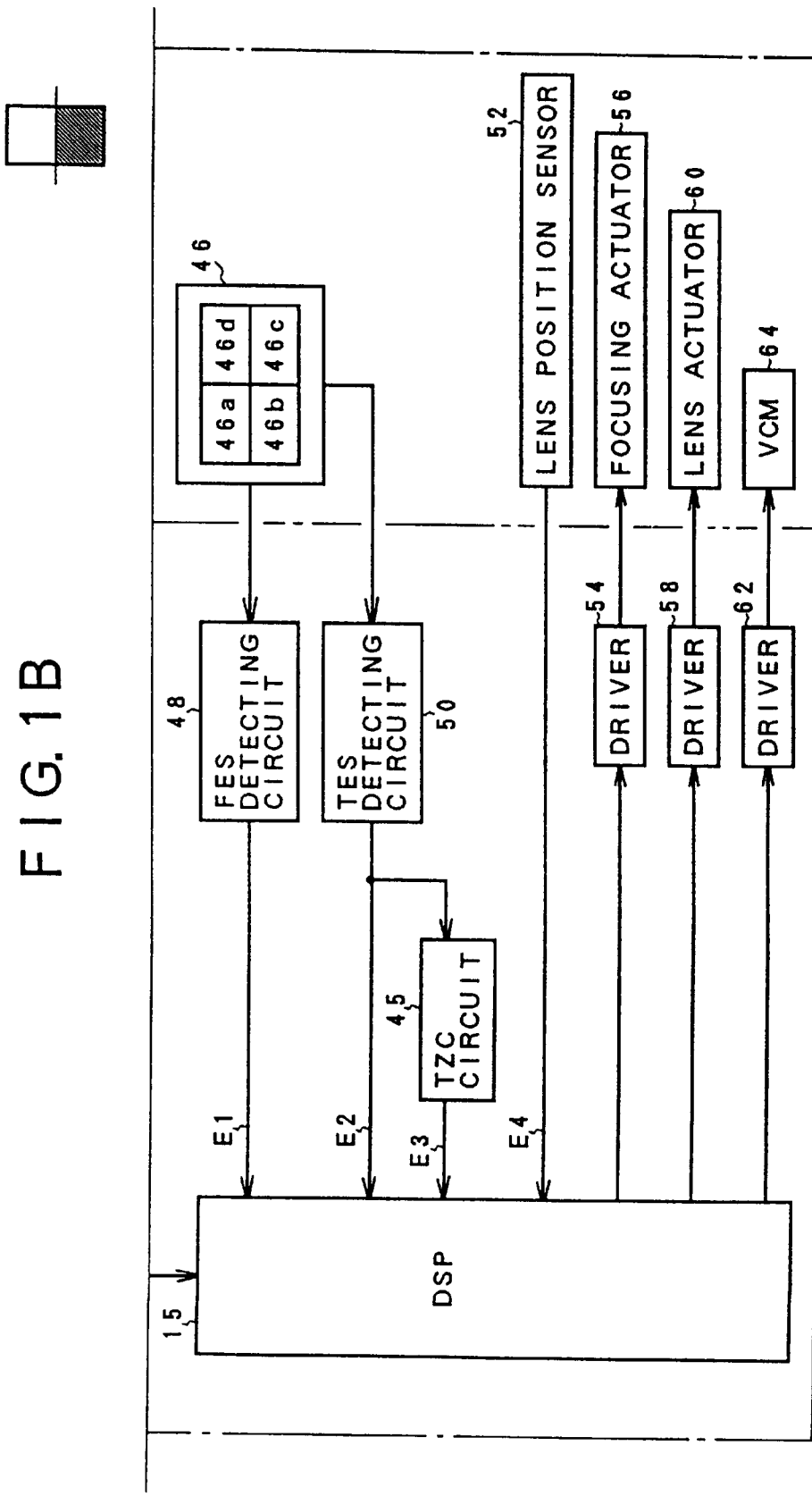

FIGS. 1A and 1B are circuit block diagrams of an optical disk drive as an optical storage apparatus of the invention. The optical disk drive of the invention is constructed by a controller 10 and an enclosure 12. The controller 10 has: an MPU 14 for executing a control of the whole optical disk drive; an interface controller 16 for transmitting and receiving a command and data to/from an upper apparatus; an optical disk controller 18 for performing a formatting process of write data to an optical disk medium and ECC encoding/decoding processes to read/write data; and a buffer memory 20 which is commonly used by the MPU 14, interface controller 16, and optical disk controller 18.

An encoder 22 and a laser diode control circuit 24 are provided as a write system for the optical disk controller 18. A control output of the laser diode control circuit 24 is supplied to a laser diode unit 30 provided for an optical unit on the enclosure 12 side. The laser diode unit 30 integratedly has a laser diode and a photosensitive device for monitoring.

As an optical disk for recording and reproducing by using the laser diode unit 30, that is, as a rewritable MO cartridge medium, any one of a 128 MB medium, a 230 MB medium, a 540 MB medium, a 640 MB medium, and direct overwrite correspondence type 540 MB medium and 640 MB medium can be used in the embodiment. With respect to the MO cartridge media of 128 MB and 230 MB among them, a pit position recording (PPM recording) for recording data in correspondence to the presence or absence of a mark on the medium is used. A recording format of the medium is based on ZCAV and is set to one zone in case of the 128 MB medium and to ten zones in case of the 230 MB medium. On the other hand, with respect to the MO cartridge media of 540 MB and 640 MB of a high density recording, a pulse width recording (PWM recording) in which edges, namely, front and rear edges of a mark are made correspond to data is used. A difference in storage capacity between 640 MB and 540 MB is caused by a difference in sector capacity. When the sector capacity is equal to 2 kB, the storage capacity is equal to 640 MB. On the other hand, when the sector capacity is equal to 512 B, the storage capacity is equal to 540 MB. Further, in case of the cartridge media of the direct overwrite correspondence type of 540 MB and 640 MB, both of the PPM recording and the PWM recording can be used. The recording format of the media is ZCAV and is set to 11 zones in case of the 640 MB medium and to 18 zones in case of the 540 MB medium. As mentioned above, the optical disk drive of the invention can correspond to the MO cartridge media of 128 MB, 230 MB, 540 MB, and 640 MB, and the cartridge media of the direct overwrite correspondence type of 540 MB and 640 MB. When a medium cartridge is loaded into the optical disk drive, an ID portion of the medium is first read, the kind of medium is recognized by the MPU 14 from the pit interval, and the recognition result of the kind is notified to the optical disk controller 18. Consequently, in case of the medium of 128 MB or 230 MB of the MO cartridge, a formatting process corresponding to the PPM recording is executed. In case of the medium of 540 MB or 640 MB, a formatting process according to the PWM recording is executed. Further, in case of the cartridge media of the direct overwrite correspondence type of 540 MB and 640 MB, a formatting process according to either the PWM recording or the PPM recording designated at that time is executed. As a reading system for the optical disk controller 18, a decoder 26 and a read LSI circuit 28 are provided. A photosensitive signal of a return light of a beam from the laser diode unit 30 received by a detector 32 provided for the enclosure 12 is inputted as an ID signal and an MO signal to the read LSI circuit 28 via a head amplifier 34. The read LSI circuit 28 has circuit functions of an AGC circuit, a filter, a sector mark detecting circuit, a synthesizer, a PLL, and the like. The read LSI circuit 28 forms a read clock and read data from the inputted ID signal and MO signal and outputs to the decoder 26. Since the zone CAV is used as a recording method of a medium by a spindle motor 40, a switching control of a clock frequency corresponding to a zone is executed for the synthesizer built in the read LSI circuit 28 by the MPU 14. A modulating method of the encoder 22 and a demodulating method of the decoder 26 are switched in accordance with the medium kind recognized by the optical disk controller 18. That is, they are switched to the modulating and demodulating methods of the PPM recording in case of the MO cartridge media of 128 MB and 230 MB. They are switched to the modulating and demodulating methods of the PWM recording in case of the MO cartridge media of 540 MB and 640 MB. Further, in case of the cartridge media of the direct overwrite correspondence type of 540 MB and 640 MB, they are switched to the modulating and demodulating methods of the PWM recording or the PPM recording designated at that time. A detection signal of a temperature sensor 36 provided on the enclosure 12 side is supplied to the MPU 14. On the basis of an environment temperature in the apparatus detected by the temperature sensor 36, the MPU 14 controls each of the light emitting powers for reading, erasing, and writing in the laser diode control circuit 24 to an optimum value in case of the MO cartridge, and controls each of the light emitting powers of reading, assisting, and writing to an optimum value in case of the direct overwrite correspondence type cartridge, respectively.

The MPU 14 controls the spindle motor 40 provided on the enclosure 12 side by a driver 38. Since the recording format of the MO cartridge is ZCAV, the spindle motor 40 is rotated at a constant speed of, for example, 3600 rpm. The MPU 14 also controls an electromagnet 44 provided on the enclosure 12 side via a driver 42. The electromagnet 44 is arranged on the side opposite to the beam irradiating side of the MO cartridge loaded in the apparatus and supplies an external magnetic field to the medium at the time of recording and erasing. A DSP 15 realizes a servo function for positioning the beam from the laser diode unit 30 to the medium. For this purpose, a 4-split detector 46 for receiving the beam return light from the medium is provided for the optical unit on the enclosure 12 side, and an FES detecting circuit (focusing error signal detecting circuit) 48 generates a focusing error signal E1 from photosensitive outputs of the 4-split detector 46 and inputs it to the DSP 15. When photosensitive signals of photosensing units 46a, 46b, 46c, and 46d of the 4-split detector 46 assume Ea, Eb, Ec, and Ed, the focusing error signal E1 is detected as follows.

$$E1=(Ea+Ec)-(Eb+Ed)$$

The focusing error signal E1 is supplied to the DSP 15 and a feedback control of a focusing actuator 56 for minimizing the focusing error signal E1 is executed in an automatic focusing control unit realized by the DSP 15. The automatic focusing control unit realized by the DSP 15 obtains an offset value (target value) serving as an optimum focal point while sequentially moving a position of an objective lens in a state where a control loop is turned off, sets the offset value of the optimum focal point to an automatic focusing control loop, and is feedback controlled so as to minimize the focusing error signal E1 by using the position (optimum focal point) of the objective lens determined by the offset value as a reference. The offset value which provides the optimum focal point is determined on the basis of any one of the following three lens positions: a lens position where a tracking error signal E2 is maximum; a lens position where an RF reproduction signal is maximum; and a lens position where a sum signal of the 4-split detector 46 is maximum. A TES detecting circuit (tracking error signal detecting circuit) 50 generates the tracking error signal E2 from the photosensitive outputs of the 4-split detector 46 and transmits it to the DSP 15. That is, when the photosensitive signals of the photosensing units 46a, 46b, 46c, and 46d of the 4-split detector 46 are called Ea, Eb, Ec, and Ed, the tracking error signal E2 is expressed as follows.

$$E2=(Ea+Eb)-(Ec+Ed)$$

The tracking error signal E2 is inputted to the DSP 15 and is further inputted to a TZC circuit (track zero-cross point detecting circuit) 45 and a track zero-cross pulse E3 is generated and inputted to the DSP 15. Further, a lens position sensor 52 for detecting a lens position of the objective lens for irradiating the laser beam to the medium is provided on the enclosure 12 side and a lens position detection signal (LPOS) E4 of the lens position sensor 52 is inputted to the DSP 15. The DSP 15 drives the focusing actuator 56, a lens actuator 60, and a VCM 64 via drivers 54, 58, and 62 for beam positioning.

Figure 2:
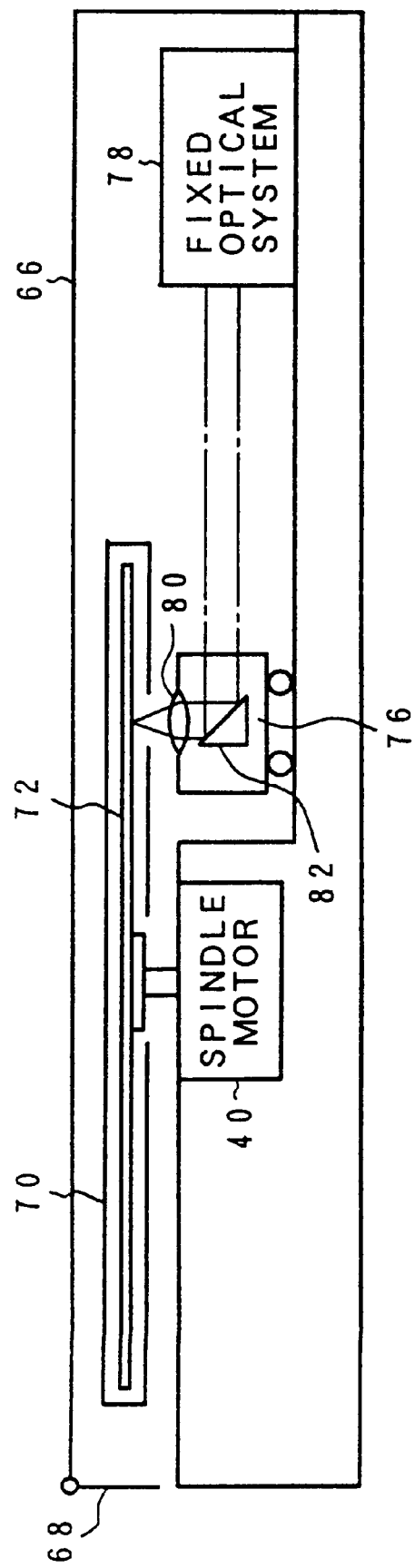
FIG. 2 is an explanatory diagram of an internal structure of an apparatus in which an MO cartridge has been loaded.

FIG. 2 schematically shows the enclosure in the optical disk drive. The spindle motor 40 is provided in a housing 66. By inserting, for example, an MO cartridge 70 from the side of an inlet door 68 into a hub of a rotary shaft of the spindle motor 40, a loading such that an MO medium 72 in the MO cartridge 70 is attached to the hub of the rotary shaft of the spindle motor 40 is performed. A carriage 76 which can be moved in the direction traversing the medium tracks by the VCM 64 is provided below the MO medium 72 of the MO cartridge 70 loaded. An objective lens 80 is mounted on the carriage 76 and a beam from a semiconductor laser provided for a fixed optical system 78 enters the objective lens 80 via a prism 82 and a beam spot is formed on the surface of the MO medium 72. The objective lens 80 is moved in the optical axial direction by the focusing actuator 56 shown in the enclosure 12 in FIG. 1 and can be also moved in a radial direction traversing the medium tracks within a range of, for example, tens of tracks by the lens actuator 60. The position of the objective lens 80 mounted on the carriage 76 is detected by the lens position sensor 52 in FIGS. 1A and 1B. The lens position sensor 52 sets the lens position detection signal to zero at a neutral position where the optical axis of the objective lens 80 is directed right overhead and generates the lens position detection signal E4 according to movement amounts having different polarities for the movement to the outer side and the movement to the inner side.

[LD light emission adjustment]

Figure 3:
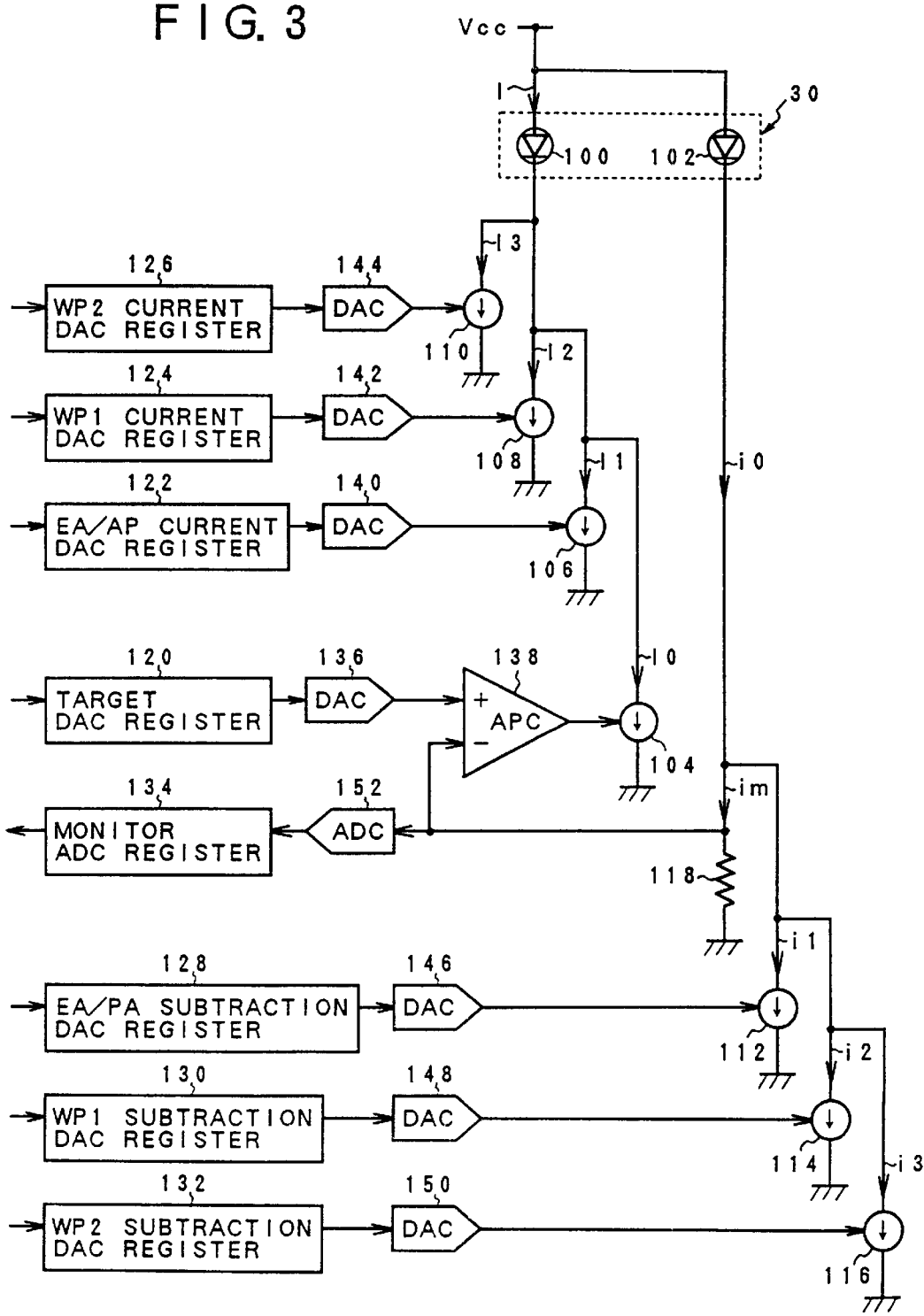
FIG. 3 is a block diagram of a laser diode control circuit in FIGS. 1A and 1B.

FIG. 3 is a circuit block diagram of the laser diode control circuit 24 provided for the controller 10 in FIG. 1. In the laser diode unit 30, a laser diode 100 and a monitor photodiode 102 are integratedly provided. The laser diode 100 receives a driving current (I) from a power voltage Vcc and emits light. A laser beam is formed and irradiated to the medium surface by the optical unit and recording and reproducing operations are performed. The monitor photodiode 102 receives a part of the light from the laser diode 100 and outputs a photosensitive current i0 which is proportional to the light emitting power of the laser diode 100. A reading power current source 104, an erasing/assisting power current source 106, a first writing power current source 108, and a second writing power current source 110 are connected in parallel to the laser diode 100 and supply a reading power current I0, an erasing/assisting power current I1, a first writing power current I2, and a third writing power current I3, respectively. Since the erasing power required by the MO cartridge medium and the assisting power required by the cartridge medium of the direct overwrite correspondence type are not simultaneously used, they can be switched and used. It will be obviously understood that a circuit exclusively used for the erasing power and a circuit exclusively used for the assisting power can be also separately provided.

For example, when considering the MO cartridge medium as an example, the reading power current I0 flows at the time of the reading power light emission, a current (I0+I1) obtained by adding the erasing power current I1 to the reading power current I0 flows at the time of the erasing power light emission, and a current (I0+I1+I2) obtained by further adding the first writing power current I2 thereto flows at the time of the first writing power light emission. A current (I0+I1+I3) obtained by adding the second writing power current I3 to the reading power current I0 and erasing power current I1 flows at the time of the second writing power light emission. In case of the direct overwrite correspondence type cartridge medium, since the erasing power is unnecessary, a current (I0+I1+I2) obtained by adding the assisting power current I1 and first writing power current I2 to the reading power current I0 flows at the time of the first writing power light emission. A current (I0+I1+I3) obtained by adding the second writing power current I3 to the reading power current I0 and assisting power current I1 flows at the time of the second writing power light emission. An automatic power control unit (hereinbelow, called an "APC") 138 is provided for the reading power current source 104. A specified target reading power is set as a target power into the APC 138 via a target DAC register 120 and a D/A converter (hereinbelow, called a "DAC") 136. An EP/AP current DAC register 122 and a DAC 140 are provided as an EP/AP current instructing unit for the erasing/assisting power current source 106. A WP1 current DAC register 124 and a DAC 142 are provided as a WP1 current instructing unit for the first writing power current source 108. Further, a WP2 current DAC register 126 and a DAC 144 are provided as a WP2 current instructing unit for the second writing power current source 110. Consequently, the currents of the current sources 104, 106, 108, and 110 can be properly changed by setting DAC instruction values to the corresponding registers 120, 122, 124, and 126, respectively. A light emission current source circuit is constructed by the registers, DACs, and constant current sources. The APC 138 executes a feedback control so that a monitor current im obtained from the photosensitive current i0 of the photodiode 102 coincides with the target voltage of the DAC 136 corresponding to the target reading power. For this purpose, subtraction current sources 112, 114, and 116 are provided for the monitor photodiode 102 in order to subtract the photosensitive currents when the light is emitted by the erasing/assisting power and the first and second writing powers which exceed the reading power and to feed back the monitor current im corresponding to the reading power to the APC. An arbitrary subtraction current i1 can be set to the subtraction current source 112 for the erasing/assisting power by an EP/AP subtraction DAC register 128 and a DAC 146 serving as an EP/AP subtraction current instructing unit. An arbitrary subtraction current i2 can be set to the subtraction current source 114 for the first writing power by a WP1 subtraction DAC register 130 and a DAC 148 serving as a WP1 subtraction current instructing unit. Further, an arbitrary subtraction current i3 can be set to the subtraction current source 116 for the second writing power by a WP2 subtraction DAC register 132 and a DAC 150 serving as a WP2 subtraction current instructing unit. The monitor currents im in the light emitting modes of the above three subtraction current sources i1, i2, and i3 are as follows.

I. At the time of the reading power light emission: im=i0

II. At the time of the erasing/assisting power light emission: im=i0−i1

III. At the time of the first writing power light emission: im=i0−(i1+i2)

IV. At the time of the second writing power light emission: im=i0−(i1+i3)

Consequently, at the time of the light emission by any one of the erasing/assisting power, the first writing power, and the second writing power exceeding the target reading power, by subtracting the corresponding subtraction current from the photosensitive current i0, the monitor current im flows as a current corresponding to the reading power into a monitor voltage detecting resistor 118 and is fed back to the APC 138. The APC 138, therefore, controls the reading power current source 104 so as to always maintain the target reading power irrespective of the kind of light emitting power, thereby realizing the automatic power control of the specified erasing/assisting power, first writing power, and second writing power. With respect to the subtraction current as well, a subtraction current source circuit is constructed by the registers, DACs, and constant current sources. A monitor voltage from the monitor voltage detecting resistor 118 corresponding to the monitor current im is converted to digital data by an A/D converter (hereinbelow, called an "ADC") 152. After the digital data was inputted to a monitor ADC register 134, it is read out to the MPU 14 side. The ADC 152 and monitor ADC register 134 consequently construct a measuring unit of the monitor current im.

FIGS. 4A to 4J are time charts for a signal of the PWM recording, a light emission current, a subtraction current, and a monitor current with respect to the cartridge medium of the direct overwrite correspondence type in the laser diode control circuit 24 in FIG. 3. Now assuming that write data of FIG. 4B is given synchronously with a write gate of FIG. 4A, the write data is converted to pulse width data of FIG. 4D synchronously with a write clock of FIG. 4C. On the basis of the pulse width data, an assist pulse is generated as shown in FIG. 4E. Further, a first write pulse is generated as shown in FIG. 4F. Moreover, a second write pulse of FIG. 4G is generated. The second write pulse has the number of pulses corresponding to a pulse width of the pulse width data of FIG. 4D. For example, the head pulse width data has a pulse width of four clocks, the next pulse width data has two clocks, and the next pulse width data has three clocks. In correspondence to them, as for the second write pulse of FIG. 4G, two pulses are generated with regard to the 4-clock width of the head data subsequently to the first write pulse of FIG. 4F, 0 pulse is generated with respect to the next 2-clock width, and one pulse is generated with respect to the third 3-clock width, thereby recording information indicative of the pulse width. FIG. 4H shows a light emission current and a power based on the assist pulse, first write pulse, and second write pulse of FIGS. 4E, 4F, and 4G and relates to the PWM recording in the overwrite media of 540 MB and 640 MB which don't need to erase. First, a read current is always supplied, thereby performing a DC light emission by a reading power RP. Therefore, a light emission current (I0+I1) flows synchronously with the assist pulse, so that the current is increased by an amount of an assisting power AP. The light emission current I2 is added at the timing of the first write pulse and the current is increased by an amount of a first writing power WP1. Further, the light emission current I3 is added at the timing of the second write pulse and the current is set to (I0+I1+I3), so that it is increased by an amount of a second writing power WP2. A subtraction current shown in FIG. 4I is supplied to subtraction current sources 112, 114, and 116 in FIG. 3 synchronously with the light emission current of FIG. 4H. The subtraction current i1 corresponding to the increased amount of the assisting power AP flows. The subtraction current i2 corresponding to the increased amount of the next first writing power WP1 is added, so that a subtraction current (i1+i2) flows. Further, the subtraction current i3 corresponding to the increased amount of the second writing power WP2 is added and a subtraction current (i1+i3) flows. Therefore, the monitor current im of FIG. 4J is set to a value in which the subtraction current of FIG. 4H is subtracted from the photosensitive current i0 corresponding to the light emission current and light emitting power of FIG. 4H. Even during the light emission, the current is always converted to a predetermined current corresponding to the reading power and is fed back to the APC 138.

FIGS. 5A to 5J are timing charts for a signal upon PPM recording, a light emission current, a subtraction current, and a monitor current of the cartridge media of 540 MB and 640 MB of the direct overwrite correspondence type. Now, assuming that write data of FIG. 5B is given synchronously with a write gate of FIG. 5A, a pit edge pulse of FIG. 5D is generated synchronously with a write clock of FIG. 5C. In response to the pit edge pulse, an assist pulse of FIG. 5E and a first write pulse of FIG. 5F are formed. In the PPM recording, a second write pulse of FIG. 5G is not used. By supplying a light emission current of FIG. 5H by such assist pulse and first write pulse to the laser diode, a light emitting power P is obtained. Now, assuming that the assisting power AP and reading power RP are equal, even at the timing of the assist pulse, the light emission by the reading power RP by the reading power current I0 is maintained. At the timing of the first write pulse, the light emission current is increased to (I1+I2), so that a power in which the amount of the assisting power AP is added to the amount of the first writing power WP1 is obtained. As a subtraction current of FIG. 5I, the subtraction current (i1+i2) is supplied at the light emitting timing of the first write pulse. Thus, the monitor current im of FIG. 5J is always maintained to the constant photosensitive current corresponding to the reading power.

[Recording power adjustment]

Figure 6A:
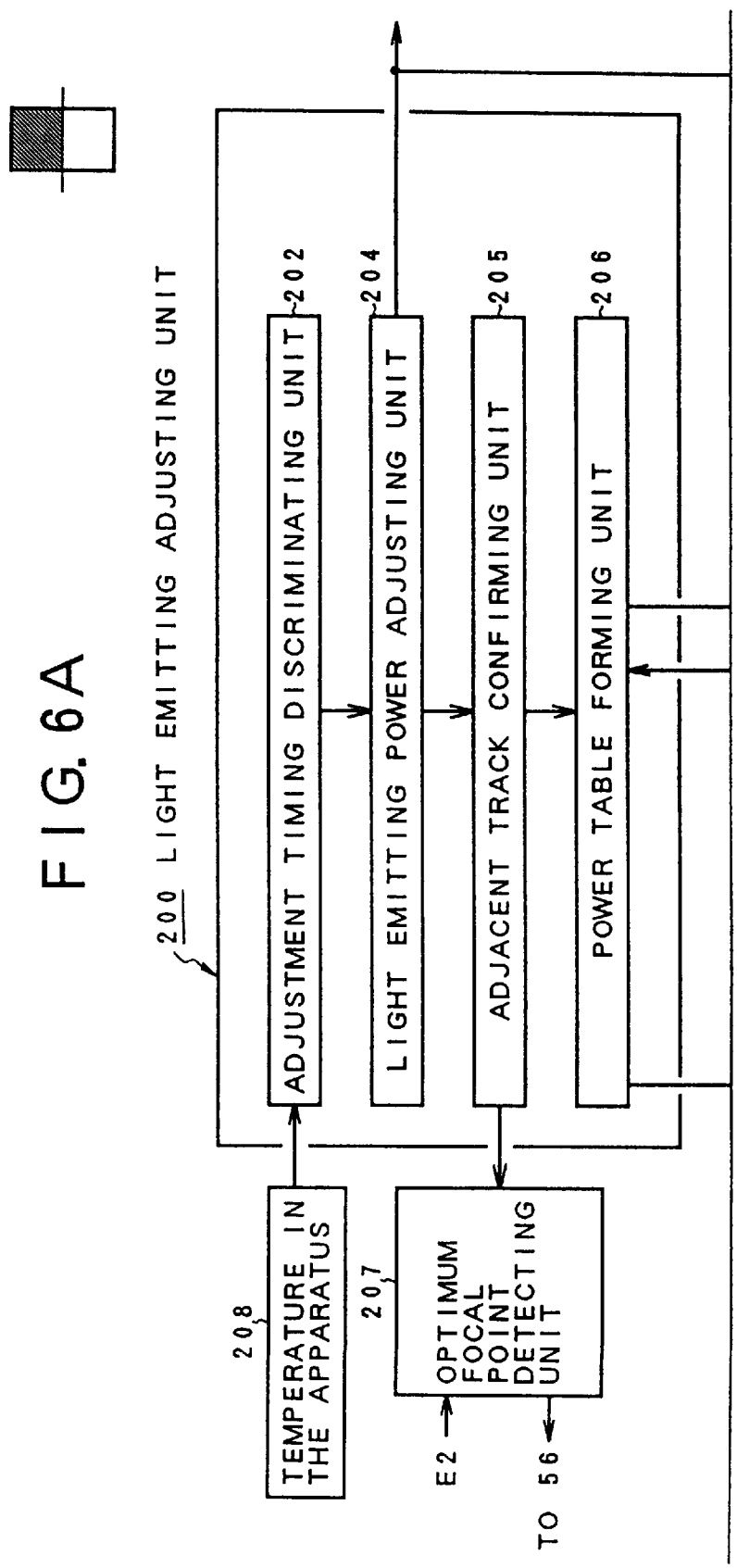
FIGS. 6A and 6B are functional block diagrams of an optimum writing power adjusting unit which is realized by an MPU in FIGS. 1A and 1B.
Figure 6B:
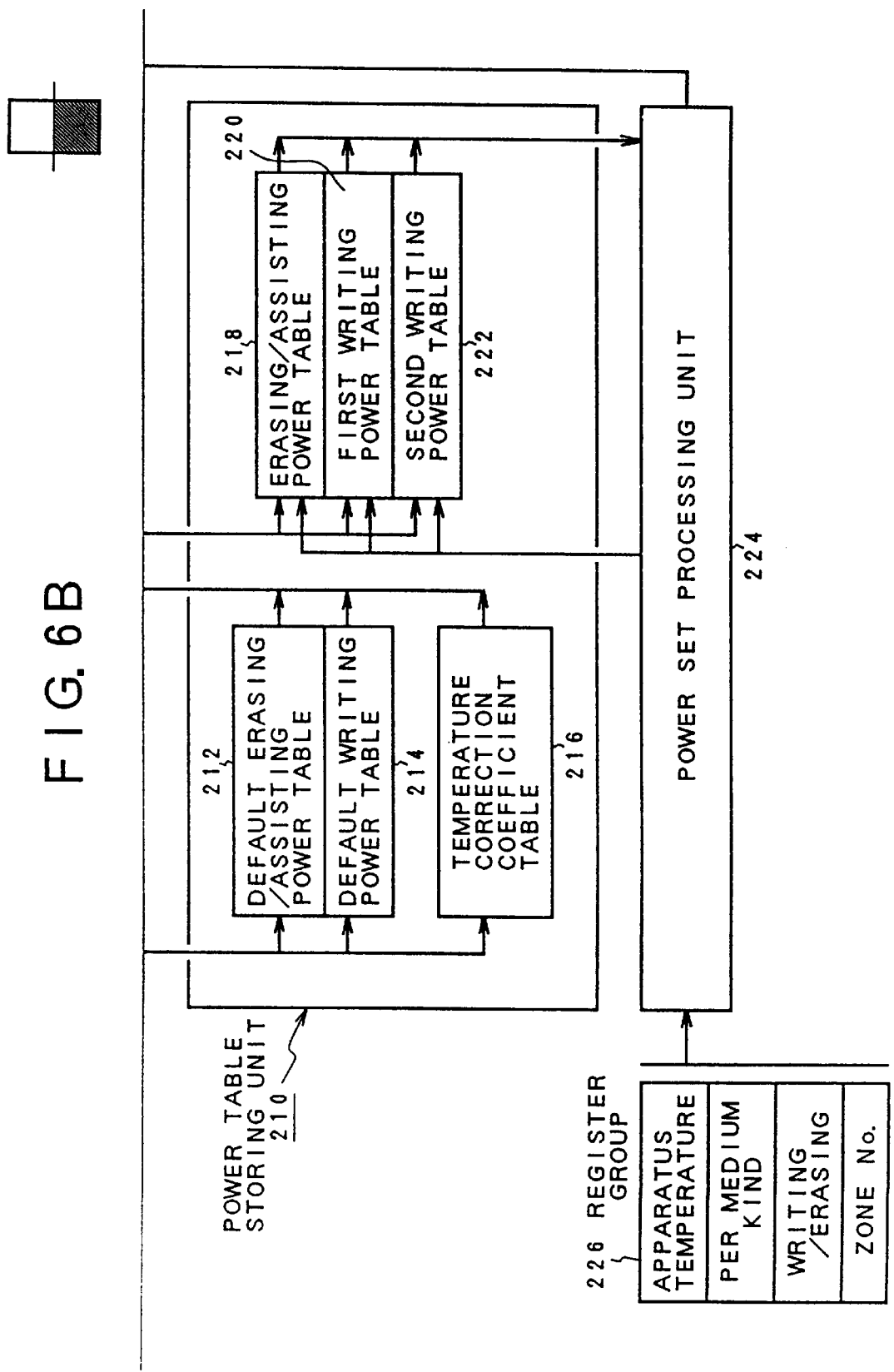
Figure 7:
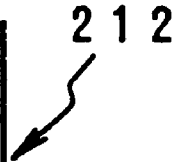
FIG. 7 is an explanatory diagram of a default erasing power table in FIGS. 6A and 6B.

FIGS. 6A and 6B are functional block diagrams of a recording power adjusting function to set the recording power (writing power and erasing/assisting power) by the laser diode which is realized by the MPU 14 of the optical disk drive in FIGS. 1A and 1B to the optimum value. A recording power adjusting unit 200 is constructed by the MPU 14. An adjustment timing discriminating unit 202, a light emitting power adjusting unit 204, an adjacent track confirming unit 205, and a power table forming unit 206 are provided for the recording power adjusting unit 200. A temperature in the apparatus is inputted to the recording power adjusting unit 200 by a register 208. A power table storing unit 210 is provided for the recording power adjusting unit 200. A default erasing/assisting power table 212, a default writing power table 214, and a temperature correction coefficient table 216 are provided for the power table storing unit 210. For example, as a default erasing/assisting power table 212, as shown in FIG. 7, default erasing powers within a range from 3.0 to 4.5 mW have been stored in correspondence to zone numbers (i=1 to 11). Actually, although the default erasing power and the default assisting power are equalized in FIG. 7, when they are different, individual tables are formed. As shown in FIG. 8, default writing powers=6.0 to 11.0 mW have been stored in the default writing power table 214 in correspondence to the zone numbers (i=1 to 11). Further, as shown in FIG. 9, temperature correction coefficients Kt=−0.1 to 0.10 have been stored in the temperature correction coefficient table 216 in correspondence to the zone numbers (i=1 to 11). The temperature correction coefficients Kt in the temperature correction coefficient table 216 of FIG. 9 are set to values when a temperature (T) in the apparatus=25° C. Further, an erasing/assisting power table 218, a first writing power table 220, and a second writing power table 222 have been provided for the power table storing unit 210. Therefore, by multiplying the default erasing/assisting power table 212 and default writing power table 214 corresponding to the zone number by a default magnification which gives the optimum writing power determined by the recording power adjusting unit 200, each power of the erasing/assisting power table 218 and first writing power table 220 can be calculated and registered. As for the second writing power table 222, since a specified power ratio in which the first writing power is set to a reference has been predetermined, by multiplying the specified power ratio to the first writing power obtained in correspondence to the zone number from the default writing power table 214, the second writing power can be obtained. Further, with respect to each of the erasing/assisting power, the first writing power, and the second writing power, the value which was subjected to the temperature correction using the temperature correction coefficient in the temperature correction coefficient table 216 based on the temperature (T) in the apparatus at that time is used. The formation of the erasing/assisting power table 218, first writing power table 220, and second writing power table 222 using the default value of the optimum writing power determined by the recording power adjusting unit 200 is performed by the power table forming unit 206. A power set processing unit 224 is provided for the power table storing unit 210. When receiving an access from an upper apparatus after completion of the adjustment of the optimum writing power, the power set processing unit 224 sets various powers by the light emission control of the laser diode on the basis of the temperature in the apparatus, a medium kind, an accessing mode of the ordinary MO cartridge medium which needs to erase and the cartridge medium of the overwrite correspondence type which doesn't need to erase, and the zone number indicative of an accessing track shown in a register group 226. At the time of the power setting, the power set processing unit 224 calculates and outputs a current instruction value for each register in the laser diode control circuit 24 shown in FIG. 3 on the basis of the data retrieved from the tables by the temperature in the apparatus, the medium kind, the accessing mode, and further, the zone number with reference to the erasing/assisting power table 218, first writing power table 220, second writing power table 222, and temperature correction coefficient table 216 in the power table storing unit 210. The adjustment timing discriminating unit 202 provided for the recording power adjusting unit 200 discriminates a recording power adjusting timing by the light emitting power adjusting unit 204 and activates the adjusting process of the recording power. The adjustment timing discriminating unit 202 doesn't activate the adjusting process of the recording power just after the medium was loaded into the optical disk drive. When the initializing process of the optical disk drive is finished and the first write command is generated from the upper apparatus, the adjustment timing discriminating unit 202 discriminates it, activates the recording power adjusting unit 204 so as to perform the first light emitting power adjusting process accompanied with the test writing of the medium. Subsequently, the adjustment timing discriminating unit 202 activates the adjacent track confirming unit 205 so as to check the presence or absence of a data error of the adjacent track by the test writing by the recording power determined. After the recording power adjusting process by the light emitting power adjusting unit 204 and adjacent track confirming unit 205 was once finished, the valid time of the writing power adjustment result is calculated. When the elapsed time from the end of the adjustment reaches the calculated valid time, the processes of the light emitting power adjusting unit 204 and adjacent track confirming unit 205 are sequentially activated for the purpose of the next recording power adjustment. For a period of time until the elapsed time reaches the valid time, when the temperature (T) in the apparatus which is inputted from the register 208 exceeds, for example, ±3° C., the recording power adjustment due to the activation of the light emitting power adjusting unit 204 and adjacent track confirming unit 205 is forcedly executed. The recording power adjusting unit 204 repeats processes such that an arbitrary test writing area in a user unused area of the loaded medium is designated, a predetermined test pattern is written to the medium while gradually decreasing the writing power step by step, the test pattern is read out after that and compared with the original test pattern, and the number of times of dissidence of the data is counted. In the test writing process, the writing power when the counted number of times of dissidence exceeds a predetermined maximum value, for instance, 1000 is detected as a limit writing power. When the limit writing power is detected while reducing the writing power step by step as mentioned above, a value in which a predetermined offset is added to the limit writing power is determined as an optimum writing power. The setting of the writing power in the light emitting power adjusting unit 204 is executed by using a default ratio in which a writing power default value at that time is set to a reference. The limit writing power, therefore, is also detected as a default ratio indicative of the limit writing power. A value in which a predetermined offset ratio is added is determined as a default ratio of the optimum writing power. After the test writing in the test writing area of the medium was performed by the light emission driving of the laser diode using the writing power and erasing/assisting power determined in the light emitting power adjusting unit 204, the adjacent track confirming unit 205 reproduces the adjacent track and checks the presence or absence of a data error. When there is no data error, the writing power and erasing/assisting power used for the test writing are set to the optimum recording power. That is, after the recording power was determined, a test writing is performed by the decided recording power. Only when the absence of the data error of the adjacent track is confirmed, such a recording power is set as a valid recording power that is used for an actual medium recording. Therefore, even in the medium of the high density recording of 540 MB or 640 MB in which a high density is realized by narrowing the track interval, the optimum recording can be realized without causing an error in the data of the adjacent track by the set recording power or being subjected to a leakage of the data from the adjacent track.

A processing procedure of the adjacent track confirming unit 205 is as follows.

I. The first test pattern is test written to all of the tracks in the test writing area.

II. The second test pattern is test written at a specified sector position of a specified track in the test writing area a specified number of times.

III. The adjacent track of the sector in which the second test pattern was test written is reproduced and the presence or absence of a data error is checked.

When the adjacent track confirming process is normally finished, the test writing area is initialization recorded (cleared by the erasing/overwriting operation). As a discrimination about the data error of the adjacent track by the adjacent track confirming unit 205, the presence of the data error is determined by detecting that a level change of a peak detection signal of the reproduced RF signal is equal to or larger than the specified value, that the reproduction data is compared with the original recording data and the number of bit errors is increased to a specified value or more, or that the number of ECC correction errors for the reproduction data is increased to a specified value or more. Further, when the data error of the adjacent track is confirmed by the test writing, the adjacent track confirming unit 205 gradually decreases the power to the lower limit recording power obtained by the test writing in the light emitting power adjusting unit 204, and the recording power at which the data of the adjacent track doesn't cause an error is obtained while repeating the test writing. In this case, the presence or absence of the data error of the adjacent track is checked by the second and subsequent test writing operations while changing the checking position on the medium. When the data of the adjacent track causes an error even if the test writing is repeated by gradually reducing the power to the lower limit recording power, the adjacent track confirming unit 205 again executes the process for again obtaining the recording power by the test writing at a different position on the medium from the beginning. In this instance, the adjacent track confirming unit 205 activates an optimum focal point detecting unit 207, searches an optimum focal point, optimizes the offset value which gives a target value of the automatic focusing control, and after that, again executes the process. For instance, a longest mark length pattern is used as a first test pattern which is used for the test writing of the adjacent track confirming unit 205 and a shortest mark length pattern having a small correlation for the longest mark length pattern is used as a second test pattern, thereby enabling the presence or absence of the data error in the adjacent track to be efficiently checked by a small data amount. A DC light emitting pattern in which the highest power on the operation of the apparatus is set to an initial value can be also used as a second test pattern.

Figure 10:
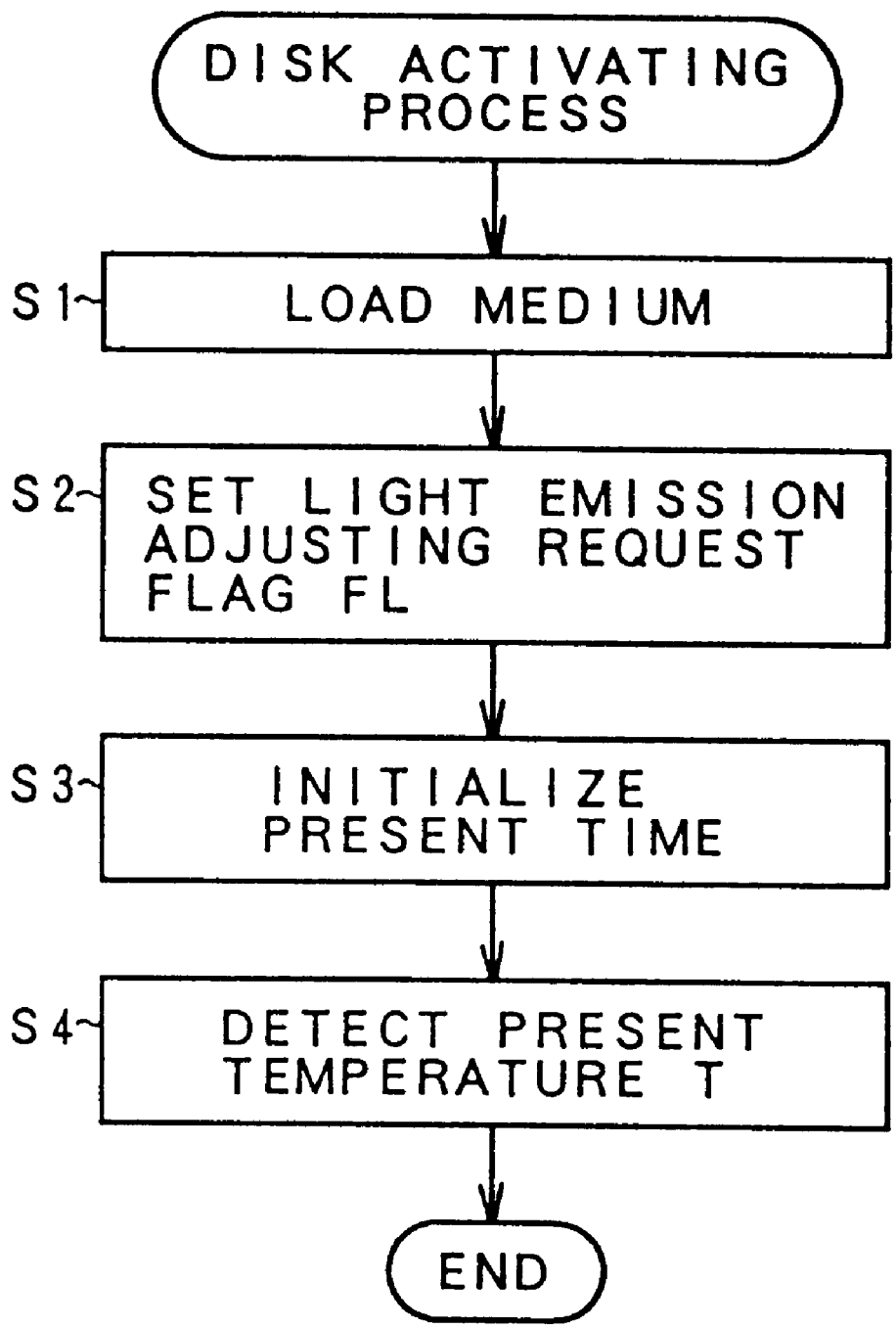
FIG. 10 is a flowchart for a disk activating process prior to a light emitting power adjustment in FIGS. 6A and 6B.

The adjusting process for deciding the optimum writing power by the light emitting power adjusting unit 200 in FIGS. 6A and 6B will now be described in detail with reference to flowcharts. FIG. 10 shows a disk activating process when a medium is loaded to the optical disk drive of the invention. As media which are used as optical disk drives of the invention, there are six kinds of media: MO cartridge media of 128 MB and 230 MB of the PPM recording which need to be erased; media of 540 MB and 640 MB of the PWM recording which need to be erased; and further, cartridge media of 540 MB and 640 MB of the direct overwrite correspondence type which don't need to be erased. In FIG. 10, the medium is loaded in step S1 and is set to the spindle motor 40 as shown in FIG. 2 and is rotated at a constant speed. Subsequently in step S2, a light emission adjustment flag FL is set. Further in step S3, the present time is initialized. In step S4, the present temperature (T) in the apparatus is detected. The processes necessary for adjustment of the recording power at the time of activation are finished. In the disk activating process, in addition to a preparing process for deciding the recording power, a formation of each coefficient table of a DAC for instructing a current provided for the laser diode control circuit and a formation of a power table for storing the default value of the light emitting power according to the function of the power set processing unit 224 in FIG. 6 are performed. Consequently, the default erasing/assisting power table 212, default writing power table 214, and temperature correction coefficient table 216 shown in FIGS. 7, 8, and 9 are prepared.

Figure 11:
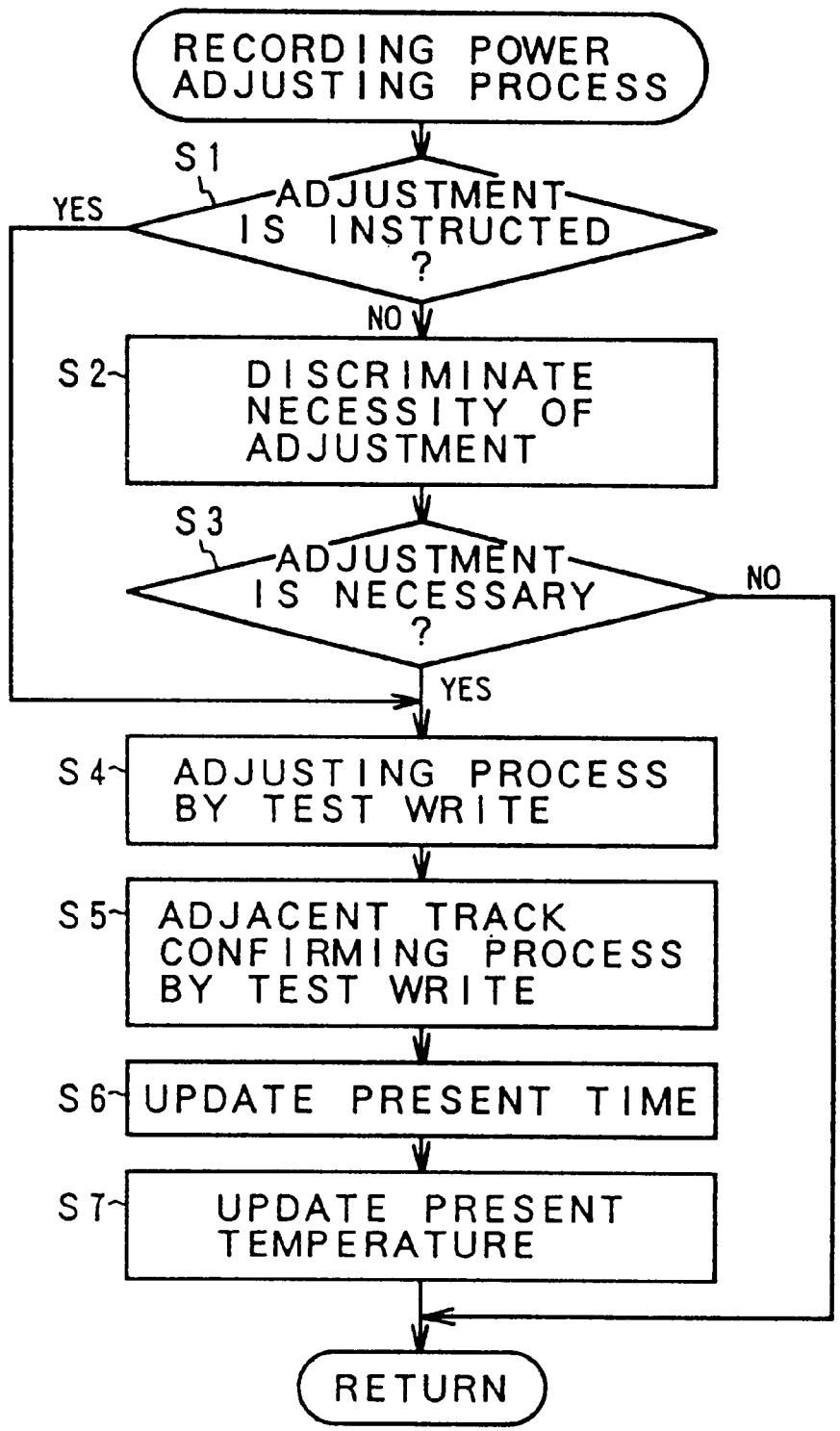
FIG. 11 is a flowchart for a recording power adjusting process including an adjacent track confirmation in FIGS. 6A and 6B.

FIG. 11 is a flowchart for the light emitting power adjusting process after the optical disk drive was activated. In the light emitting power adjusting process, the presence or absence of a light emission adjusting request from an upper apparatus is discriminated in step S1. If there is the request, step S4 follows and the adjusting process by the test writing is executed. Since there is not the light emission adjusting request from the upper apparatus in the ordinary state, the processing routine advances to step S2 and the necessity of the adjustment is discriminated. The discrimination about the necessity of the light emission adjustment is performed by the adjustment timing discriminating unit 202 in FIG. 6. When the necessity of the light emission adjustment is determined in step S3, step S4 follows and the light emitting power adjusting unit 204 executes the test writing, thereby deciding the writing power and erasing/assisting power. In step S5, a process for discriminating the presence or absence of a data error of the adjacent track by the test writing using the writing power and erasing/assisting power determined in step S4 is executed, thereby obtaining the optimum writing power and erasing/assisting power at which no data error occurs in the adjacent track. Subsequently in step S6, the present time is updated and the time when the optimum recording power is determined by the light emission adjustment and the check of the adjacent track is held. In step S7, the present temperature is updated and the temperature in the apparatus when the optimum recording power is determined is held.

Figure 12B:
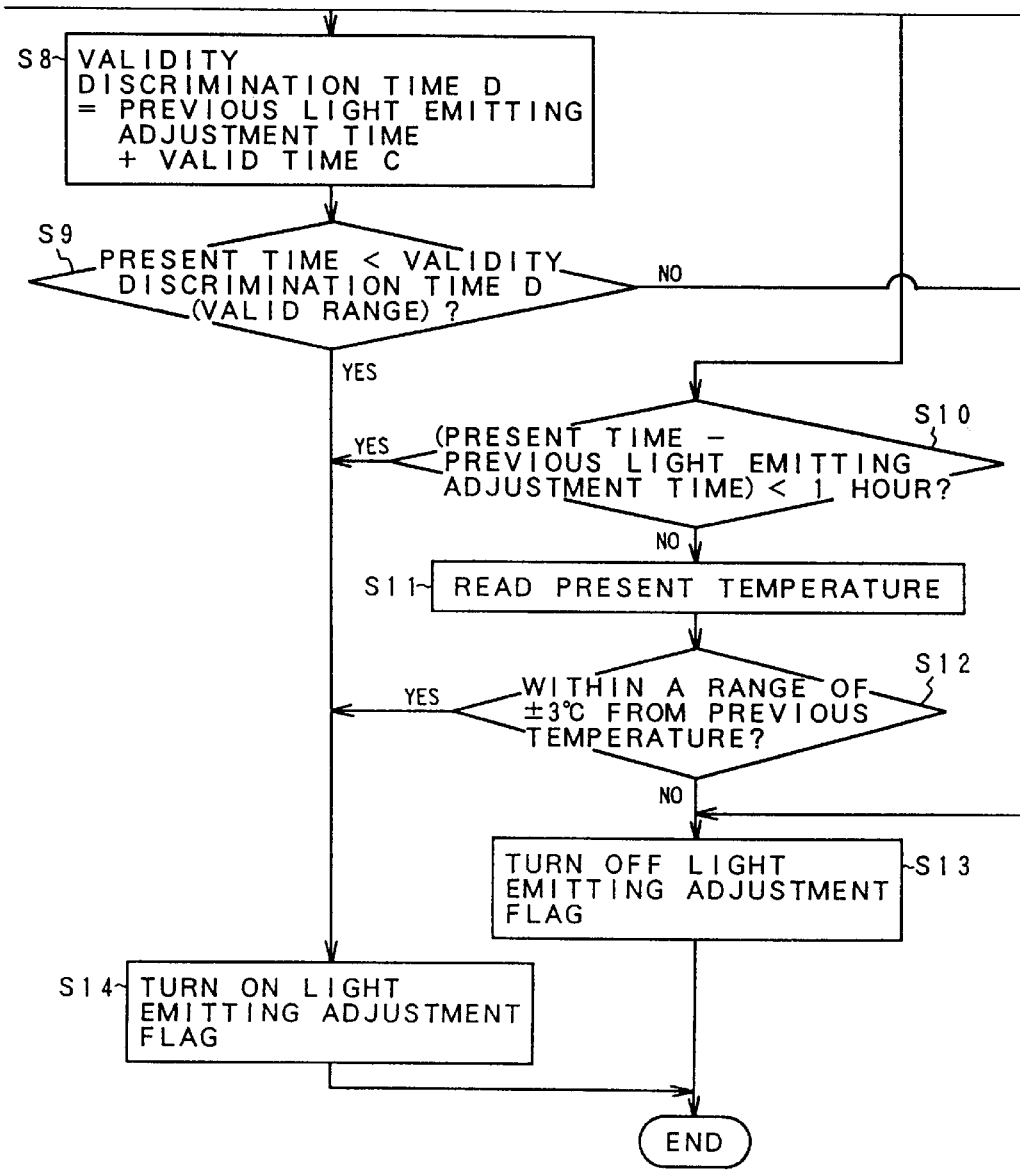

FIGS. 12A and 12B are flowcharts for the process for discriminating the necessity of the light emission adjustment in step S3 in FIG. 11. In the necessity discriminating process of the light emission adjustment, first in step S1, the present time is read. In step S2, a time (A) which is required from the activation of the optical disk drive to the previous light emission adjustment is calculated. In step S3, the time (A) from the activation is converted into the number (B) of unit times by dividing the time (A) by a predetermined time, for example, 20 seconds. In step S4, a check is made to see if the unit time number (B) is less than 8, namely, whether the time (A) that is required from the activation to the first test writing is less than 160 seconds or not. When it is less than 160 seconds, step S5 follows and a check is made to see if the unit time number (B) is less than 4, namely, whether the time (A) is less than 80 seconds or not. When the time (A) lies within a range from 80 to 160 seconds, the unit time (B) is clipped to 3, namely, the time (A) is clipped to 30 seconds in step S6 and the processing routine advances to step S7. When the time (A) is less than 80 seconds in step S5, the processing routine directly advances to step S7. In step S7, a valid time (C) to guarantee the use of the optimum recording power determined in the previous light emission adjustment is calculated. In this case, the valid time (C) is set to 20 seconds×$2^B$ (unit time number). The maximum value of the valid time is limited to 160 seconds. Thus, the valid time (C) to guarantee the optimum recording power determined by the light emission adjustment is set to the time corresponding to $2^B$ when the time (A) from the activation to the first light emission adjustment is less than 160 seconds. When the time (A) exceeds 160 seconds, it is fixed to the predetermined valid time (C)=160 seconds. Such a calculation of the valid time (C) is varied in accordance with the time that is required until the temperature of the medium loaded into the optical disk drive is stabilized to the temperature in the apparatus. That is, at the initial stage just after the medium was loaded, since there is a difference between the medium temperature and the temperature in the apparatus, the adjustment of the recording power based on the temperature in the apparatus cannot effectively be performed at this stage, so that the adjustment of the recording power is not performed upon activation. After the elapse of 1 to 2 minutes, the temperature of the loaded medium is balanced to the temperature in the apparatus. Therefore, the first light emitting power adjustment is performed synchronously with the timing when a write command is first generated from the upper apparatus after the optical disk drive was activated. Since there are various timings when the write command is generated from the upper apparatus after the activation, in steps S1 to S7 in FIGS. 12A and 12B, the time (A) from the activation to the first light emission adjustment is obtained and the valid time (C) for discrimination of the next and subsequent light emission adjustment timings are determined from the time (A). When the valid time (C) can be calculated in step S7, a validity discrimination time (D) is calculated as a time in which the calculated valid time (C) is added to the previous test writing time in step S8. In step S9, a check is made to see if the present time has exceeded the validity discrimination time (D). When the present time exceeds the validity discrimination time (D), step S14 follows and a light emission adjustment flag is turned on. The processing routine is returned to step S3 in FIG. 11. When the present time doesn't reach the validity discrimination time (D) in step S9, the light emission adjustment flag is turned off in step S13. When the unit time (B) is equal to or larger than 8, namely, is equal to or larger than 160 seconds in step S4, step S10 follows and a check is made to see if the time in which the previous light emission adjusting time is subtracted from the present time is less than one hour. If it is less than one hour, the present temperature is read in step S11. In step S12, a check is made to see if the present temperature lies within a range of ±3° C. from the previous temperature. When it lies within 3° C., the light emission adjustment flag is turned off in step S13 and the light emission adjustment is not performed. When there is a temperature fluctuation exceeding the range of ±3° C. from the previous temperature, the light emission adjustment flag is turned on in step S14 and the light emission adjustment is executed. When the difference between the present time and the previous light emission adjustment time is equal to or larger than one hour in step S10, the light emission adjustment flag is forcedly turned on in step S14 and the light emission adjustment is executed. Each of the threshold times settled in the necessity discriminating process of the light emission adjustment can be properly determined as necessary.

Figure 13B:
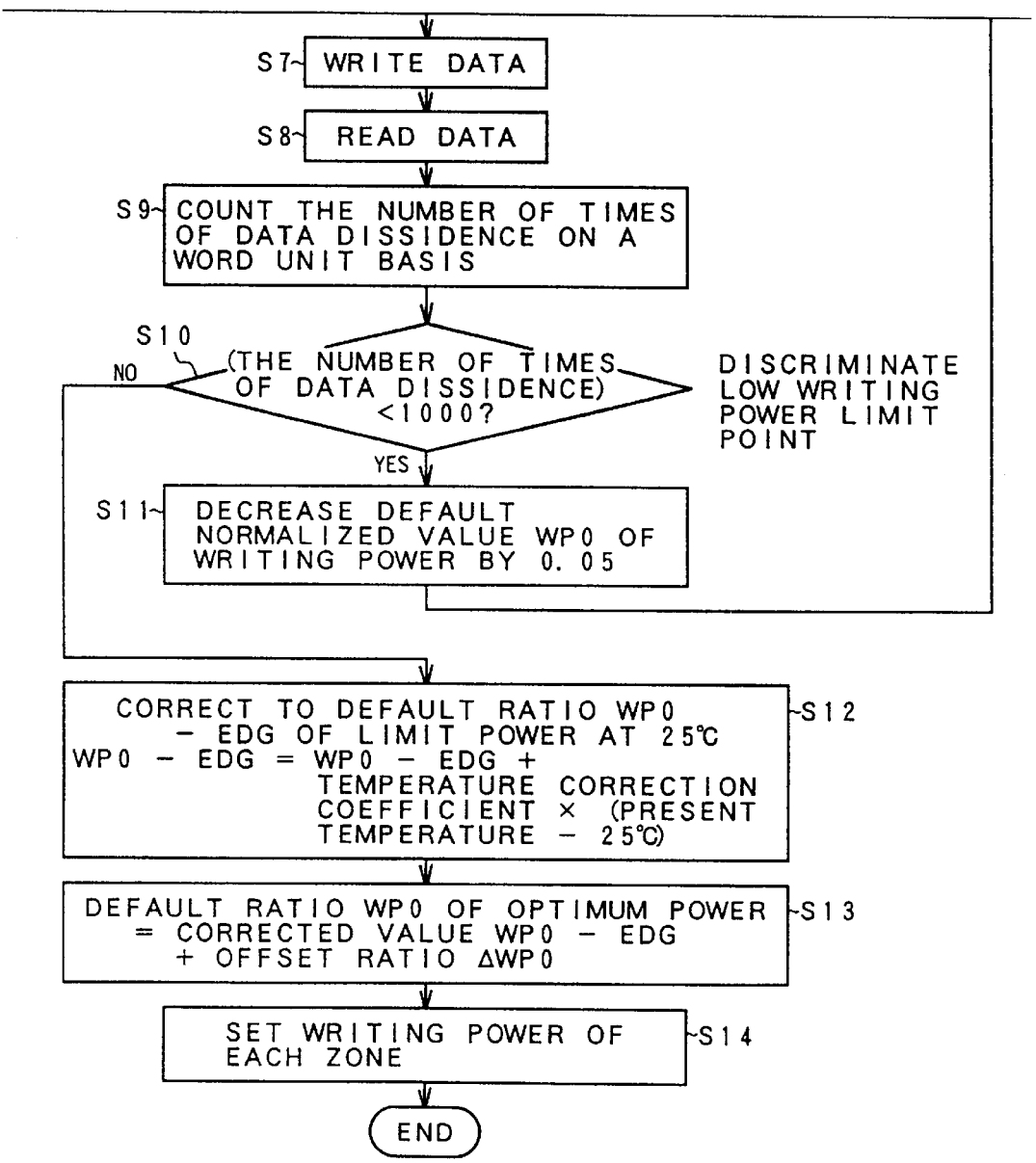

FIGS. 13A and 13B show the light emission adjusting process accompanied with the test writing which is executed in step S4 in FIG. 11. This process is executed by the light emitting power adjusting unit 204 in FIG. 6. First in step Si, the temperature (T) in the apparatus is measured. In step S2, a write pattern "596595" and hexadecimal test patterns of "FEDC, . . . , 3210" are formed in the buffer memory 20 provided for the controller 10 in FIG. 1. The test pattern "596595" is a worst pattern in which the largest error will occur is presumed. "FEDC, . . . , 3210" is all patterns of each word of hexadecimal notation. In step S3, a test write execution sector to perform a test writing is formed. As will be clearly explained hereinlater, in the test write execution sector, a test area decided in a non-user area of the medium is designated and a sector address is generated. In step S4, a default ratio WP0 of a start writing power WP is calculated from the temperature in the apparatus. In step S5, the writing power WP is calculated by multiplying the default ratio WP0 by a default writing power DWP. In step S6, an erasing power EP or an assisting power AP are calculated by using the default ratio WP0. In the calculation of the erasing power EP, a default ratio of the erasing power obtained by adding 1 to a value in which a coefficient 0.7 is multiplied to a value obtained by subtracting 1.0 from the default ratio WP0 of the writing power is used and multiplied to a default erasing power DEP, thereby calculating the erasing power EP. That is, a fluctuation ratio of the erasing power is suppressed for the writing power. The above point is also similarly applied to the assisting power AP. In step S7, a data writing in which the two kinds of write patterns formed in the buffer memory in step S2 are test written into the test area of the medium is executed by using the calculated writing power WP and erasing power EP (or assisting power AP). In this instance, when the medium is the medium of 128 MB or the medium of 230 MB, the PPM recording is executed. In case of the medium of 540 MB or the medium of 640 MB, the PWM recording is performed. After completion of the data writing of the test writing, a data reading of the test patterns is performed in step S8. In step S9, the read patterns are compared with the original write pattern in the buffer memory, thereby counting the number of times of data dissidence on a word unit basis. In step S10, when the number of times of data dissidence is less than 1000, this means that the writing power doesn't reach the lower limit point of the writing power, the processing routine advances to step S11. The default ratio WP0 of the writing power is reduced by a predetermined value 0.05. The processing routine is again returned to step S5 and the light emission adjustment using the default ratio WP0 which was reduced by only 0.05 is executed. The data writing of the test writing is repeated while reducing the default ratio WP0 of the writing power. When the number of times of data dissidence is equal to or larger than 1000 in step S10, it is determined that the writing power has reached the lower limit point. In step S12, the default ratio is corrected to a default ratio (WP0–EDG) of the lower limit power of 25° C. That is, a value obtained by multiplying a temperature correction coefficient to a value in which 25° C. is subtracted from the present temperature is added to the lower limit (WP0–EDG) of the writing power determine in step S12, thereby correcting the default ratio. In step S13, the default ratio WP0 of the optimum power is calculated by adding a predetermined offset ratio $\Delta WP0$ to the temperature correction value. In step S14, the writing power of each zone is set on the basis of the default ratio WP0 of the optimum writing power which was determined.

FIG. 14 shows the number of times of data dissidence when the light emitting power in the light emission adjustment in FIGS. 13A and 13B is reduced step by step. First, the light emission adjustment is started by the setting of the default writing power DWP at a start point 228. The light emission adjustment is performed while reducing the default value by 0.05 at a time from a start default ratio 1.0, thereby obtaining the number of times of dissidence. When the writing power WP approaches the lower limit writing power WP, the number of times of dissidence increases. When the number of times of dissidence reaches a predetermined threshold value, for example, 1000, it is detected as a lower limit value 230. By adding the predetermined offset ratio $\Delta WP0$ to a default ratio WP0-limit corresponding to the lower limit writing power WP at the lower limit value 230 in this instance, a default ratio WP0-best which gives the optimum writing power WP is determined.

Figure 15:
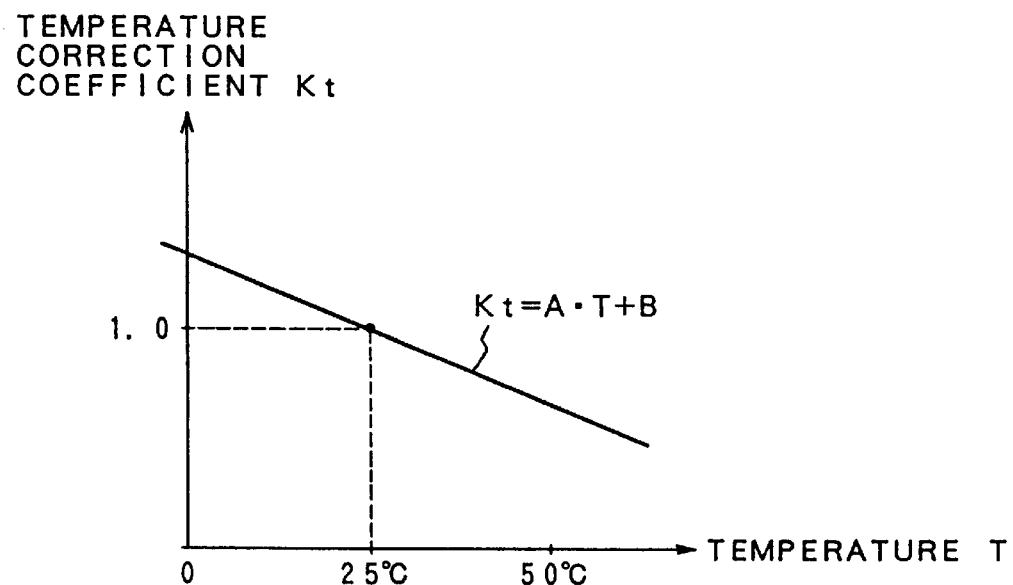
FIG. 15 is an explanatory diagram of a temperature correction coefficient for correcting a temperature of an offset ratio to obtain an optimum power by adding to the limit power in FIGS. 13A and 13B.

FIG. 15 shows the temperature correction coefficient Kt for the temperature (T) of the offset ratio $\Delta WP0$ which is added to the default ratio of the limit power in step S13 in FIG. 13B. The temperature correction coefficient Kt to correct the offset ratio $\Delta WP0$ for the temperature (T) is determined by an inclination (A) and a (y) axis cross point (B) as coefficients of a relational equation $Kt=A \cdot T+B$ of a linear approximation in which the correction coefficient Kt at the temperature ($T=25°$ C.) is equal to ($Kt=1.0$). Therefore, by substituting the temperature (T) in the apparatus into the relational equation, a value of the corresponding temperature coefficient Kt is obtained. By multiplying this value by the default offset ratio $\Delta WP0$ obtained at the temperature ($T=25°$ C.), the default offset ratio $\Delta WP0$ which is used for calculation of the optimum writing power can be obtained.

Figure 16:
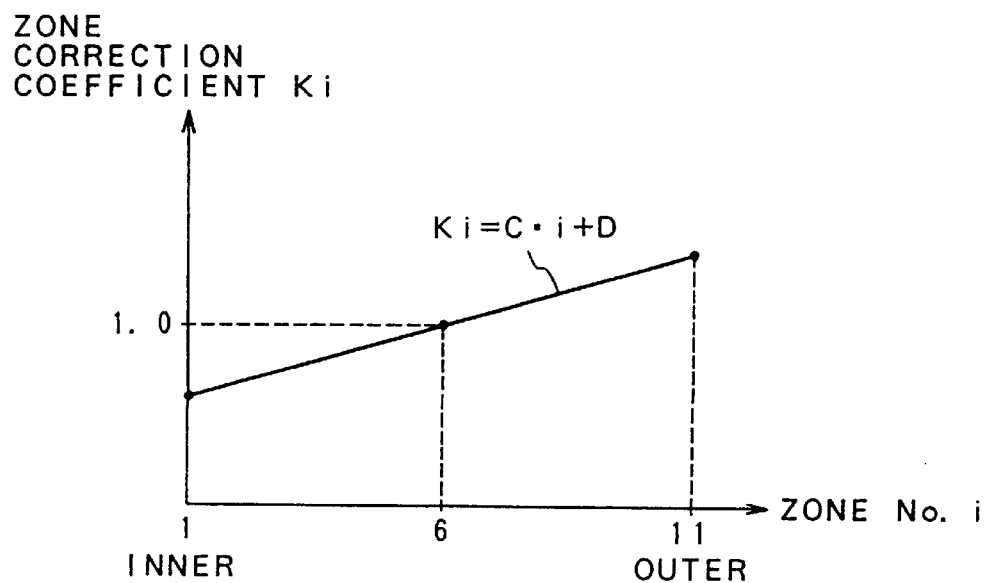
FIG. 16 is an explanatory diagram of the correction coefficient for a zone position of the offset ratio to obtain the optimum power by adding to the limit power in FIGS. 13A and 13B.

FIG. 16 shows a relational equation of the linear approximation of a zone correction coefficient Ki for the zone number of the offset ratio $\Delta WP0$ which is used in step S13 in FIG. 13. This relational equation is determined by ($Ki=C \cdot i+D$) and an inclination (C) and a (y) axis cross point (D) are prepared as coefficients. Since the zone correction coefficient Ki is set to 1.0 at the center zone No. ($i=6$), the default offset ratio $\Delta WP0$ at the zone No. 6 is prepared. The zone correction coefficient Ki is obtained from a relational equation ($Ki=C \cdot i+D$) for an arbitrary zone No. (i) and is multiplied to the default offset ratio $\Delta WP0$ of the zone No. (i), so that the offset ratio $\Delta WP0$ which is used for calculation of the optimum writing power in step S13 can be obtained.

Figure 17:
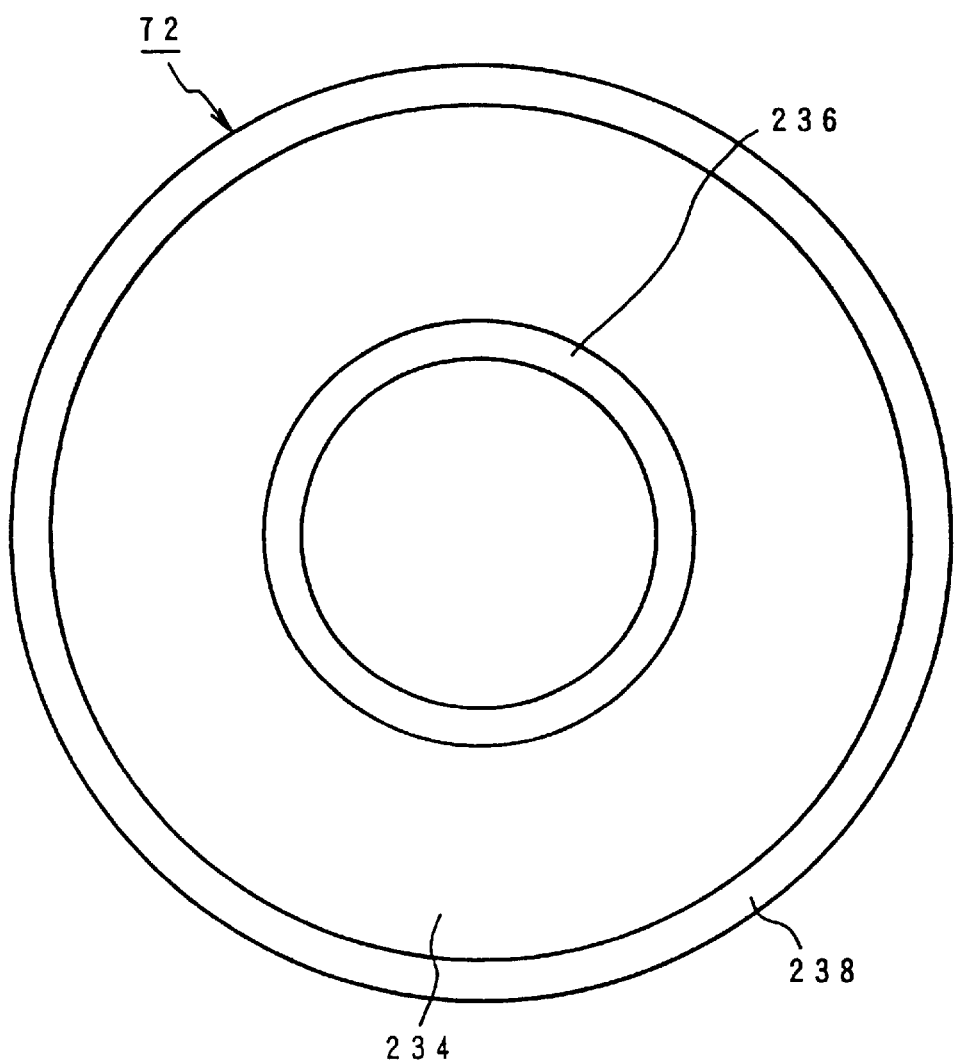
FIG. 17 is an explanatory diagram of an area on a medium.

FIG. 17 shows an area of the medium 72. As a test writing area that is used for the test writing at the time of the light emission adjustment of the invention, a non-user area 236 on the inner side or a non-user area 238 on the outer side for a user area 234 is allocated to a power adjusting area.

Figure 18A:
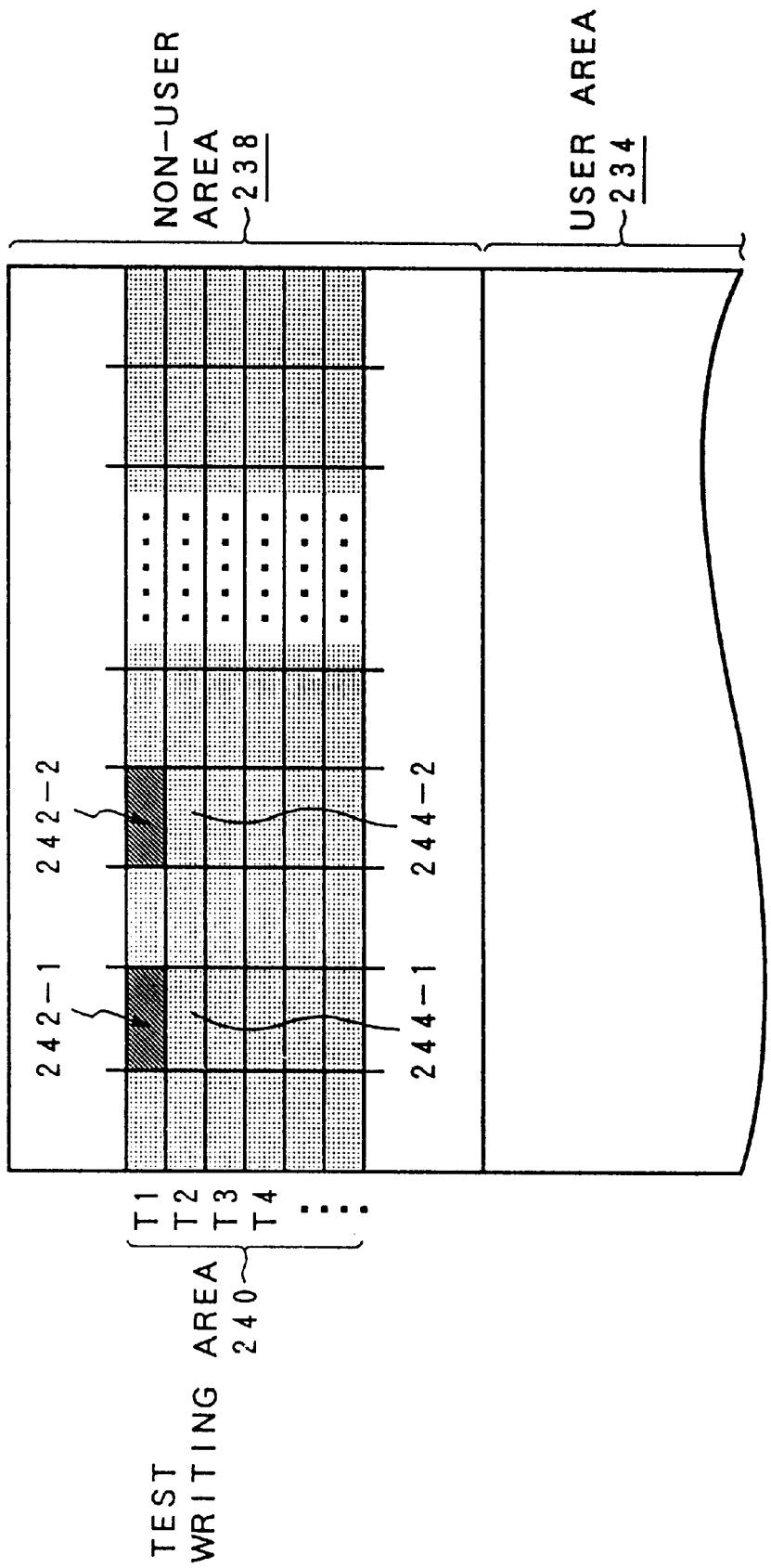

FIGS. 18A and 18B show the non-user area 238 on the outer side in FIG. 17. A test writing area 240 is set with respect to ranges of predetermined tracks T1, T2, T3, . . . in the non-user area 238. In step S1 in FIG. 13, therefore, by designating arbitrary track address and sector number in the test writing area 240, a sector to perform the test writing is designated. As a method of designating the sector to perform the test writing, in order to avoid that the test writing is concentrated to a specified sector, test sectors are designated at random by using random numbers or test sectors are sequentially designated in accordance with a predetermined order. After completion of the light emission adjustment, the test sector in which the test writing was performed is initialization recorded by erasing. The test area of the medium to perform the test writing is also similarly used at the time of the check of the adjacent track which is performed after the recording power was obtained by the light emission adjustment.

[Adjacent track confirming process]

Figure 19B:
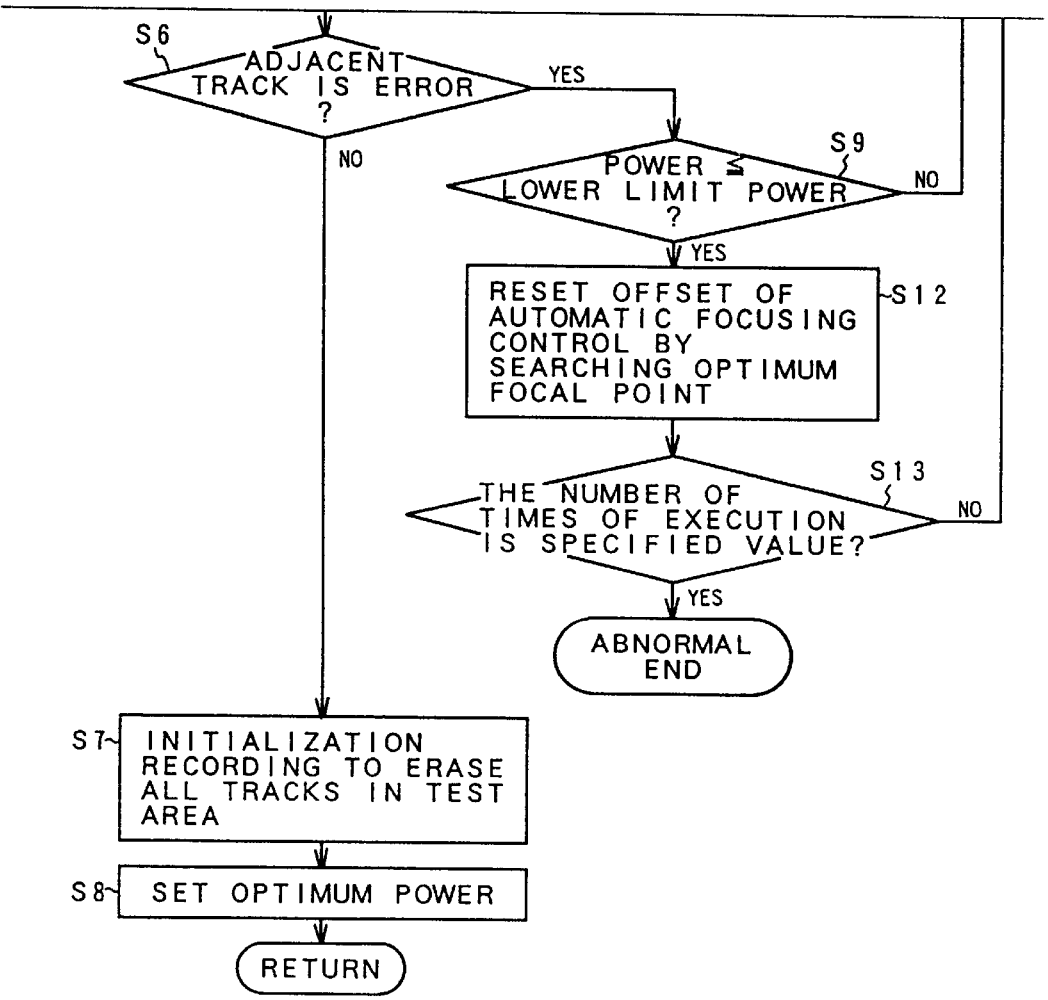

FIGS. 19A and 19B are flowcharts for the adjacent track confirming process accompanied with the test writing in step S5 in FIG. 11. First, prior to the adjacent track confirming process, an offset value which gives the optimum focal point is searched by the optimum focal point detecting unit 207 provided for the adjacent track confirming unit 205 in FIG. 6 and is set into an automatic focal point control loop. The function of the optimum focal point detecting unit 207 is executed by the DSP 15 provided for the controller 10 in FIG. 1. That is, the DSP 15 discriminates the offset value which gives the optimum focal point from the tracking error signal E1 at that time or an RF reproduction signal which is detected from the detector 32 while increasing a focusing offset value step by step through the driver 54 for the focusing actuator 56 in the off state of the automatic focal point control loop. Specifically speaking, any one of the following three conditions is selected.

I. The offset value at which the tracking error signal E2 becomes maximum is set to the optimum focal point.

II. The offset value at which an amplitude of the RF reproduction signal of either an MO signal or an ID signal obtained from the detector 32 through the head amplifier 34 becomes maximum is set to the optimum focal point.

III. The offset value at which the sum signal (Ea+Eb+Ec+Ed) of the 4-split detector 46 becomes maximum is set to the optimum focal point.

As mentioned above, by setting the offset value obtained by searching the optimum focal point in step S1 into the automatic focal point control loop and performing the automatic focal point control, the adjacent track confirming process is started in a state where the beam spot to the medium is optimized. In step S2, for example, the test writing area 240 is set as shown in FIG. 18A into the non-user area of the medium 72 in FIG. 17, for instance, the non-user area 238 on the outermost side. As shown in hatched regions, the first test pattern is written into, for example, all of the tracks T1, T2, . . . in the test writing area 240 on a sector unit basis by the driving of the laser diode by the recording power including the writing power and erasing/assisting power which were set at that time. For instance, a longest mark length pattern is used as a first test pattern at this time. In step S3, the reproduction signal is checked by reading the first test pattern written in the adjacent track T2 of the confirmation target track T1. In step S4, a specified sector, for example, a sector 242-1 of the confirmation target track T1 is designated and the second test pattern is test written a predetermined number of times by the light emission driving of the laser diode by the present recording power in order to check the presence or absence of an error of the reproduction data of a sector 244-1 of the adjacent track T2. For instance, a shortest mark length pattern is used as a second test pattern at this time. In step S5, the sector 244-1 of the adjacent track T2 which neighbors the sector 242-1 of the track T1 in which the second test pattern was written the predetermined number of times is read, thereby discriminating the presence or absence of a data error from the reproduction signal. The discrimination of the data error of the reproduction signal in step S5 is performed by any one of the following three conditions.

I. When the level change of the peak detection signal of the reproduced RF signal is less than the specified value, the absence of the data error is decided. When it is detected that the level change is equal to or larger than the specified value, the presence of the data error is decided.

II. The recording data and the reproduction data are compared on a bit unit basis. When the number of bit errors is less than a specified value, the absence of data error is determined. When it is detected that it is increased to the specified value or more, the presence of the data error is determined.

III. When the number of ECC errors which are corrected in an ECC circuit of a formatter provided for the controller 10 in FIG. 1 for the reproduction data is less than, for example, a specified value showing the number of correctable errors, the absence of the data error is determined. When it is equal to or larger than the specified value, the presence of the data error is decided.

The presence or absence of the data error is discriminated from the state of the reproduction signal of the adjacent track in step S5. When there is no data error of the adjacent track in step S6, the initialization recording to erase all of the tracks (or overwrite the initial value) in the test writing area 240 in FIG. 18A is performed. After that, in step S8, the optimum power is set on the basis of the recording power which could be confirmed by the test writing at that time. When the presence of the error of the reproduction data of the adjacent track is decided in step S6, step S9 follows and a check is made to see whether the power is equal to or less than the lower limit power 230 obtained at the time of the light emission adjustment in FIG. 14 or not. When it is larger than the lower limit power, the processing routine is returned to step S10 and the recording power is reduced by an amount of only a predetermined ratio α. After that, the position of the confirmation sector is changed to, for instance, a sector 242-2 in FIG. 18A and the processing routine is returned to step S4. The second test pattern is test written to the changed confirmation sector 242-2 a specified number of times by the light emission driving of the laser diode by the recording power changed in step S10. In steps S5 and S6, an adjacent sector 244-2 of the adjacent track T2 is read and a data error of the reproduction signal is discriminated. When the data error of the reproduction signal of the adjacent track is not eliminated, the same processes are repeated in step S9 while reducing the recording power WP to the lower limit power or less. When there is none of a medium defect and a special abnormality, ordinarily, the test writing of the specified number of times of the second test pattern to the confirmation sector of the write target track and the check of the sector reproduction signal of the adjacent track are repeated while reducing the recording power by a predetermined ratio α at a time in step S10, so that the recording power at which the data of the reproduction signal doesn't cause an error is obtained. After the test writing area 240 was initialization recorded in step S7, the optimum power can be set in step S8 on the basis of the recording power at which the data error of the reproduction signal of the adjacent track didn't occur. However, when the data error occurs in the sector reproduction signal of the adjacent track even if the recording power is reduced to the lower limit power or less in step S9, the offset value is reset by searching the optimum focal point in step S12 in a manner similar to step S1. After that, until the number of execution times reaches a specified value in step S13, the processing routine is returned to step S2 and the adjacent track confirming process is repeated from the beginning. In the case where the data error of the adjacent track cannot be eliminated even if the adjacent track confirming process is repeated until the number of execution times of the adjacent track confirming process reaches the specified value from step S2, the processing routine advances to step S14 from step S13. In this case, the processes are finished as an abnormality.

In FIG. 18A, the optimum power is set on the basis A of the recording power at which the data error of the reproduction signal didn't occur due to the test writing of the first and second test patterns to two adjacent when tracks, for example, tracks T1 and T2 of the test writing area 240 are designated as targets. As shown in FIG. 18B, however, the optimum power can be also set on the basis of the recording power at which the data error of the reproduction signal didn't occur due to the test writing in which three tracks, for instance, tracks T1 to T3 are designated in the test area. That is, in FIG. 18B, the first test pattern is test written to the center track T2 among at least three adjacent tracks T1, T2, and T3 by the light emission driving of the laser diode-by the recording power including the predetermined erasing power and writing power and, subsequently, the second test pattern is sequentially test written to the two tracks T1 and T3 on both sides. After that, the adjacent track T2 in which the first test pattern was first test written is reproduced and the presence or absence of a data error is checked. When there is no data error, the recording power at which the test writing was performed is set to the optimum recording power. In FIG. 18B as well, in a manner similar to FIG. 18A, the first test pattern is test written to all of the three adjacent tracks T1, T2, and T3 and, subsequently, the second test pattern is sequentially test written to specified sectors of the two tracks T1 and T3 on both sides. After that, the sector of the adjacent track T2 in which the first test pattern was first test written and which neighbors the sector in which the second test pattern has been written is reproduced and the presence or absence of a data error is checked. When there is no data error, the recording power at which the test writing was performed can be also set to the optimum recording power.

FIGS. 20A to 20E are time charts showing the first test pattern which is used in the adjacent track confirming process in FIGS. 19A and 19B and its light emitting power with respect to the PWM recording, as an example, of the cartridge medium of 540 MB or 640 MB of the direct overwrite correspondence type. FIGS. 20A to 20E shows the write data of the first test pattern which is first test written to the whole test writing area 240, PWM data, a first write pulse, second write pulse, and a light emitting power. As will be obviously understood from the PWM data of FIG. 20B, the longest mark length pattern is used as a first test pattern.

The longest mark length pattern is "1111•••110" when it is shown by a bit pattern as write data. In the PWM data of FIG. 20B, one first write pulse of FIG. 20C and, subsequently, the second write pulses of FIG. 20D of the number corresponding to the longest mark length are arranged. The PWM data is first test written to all of the tracks in the test writing area 240 by the light emitting power as shown in FIG. 20E.

FIGS. 21A to 21E show write data of the second test pattern which is test written a specified number of times into the specified sector of the confirmation target track, PWM data, a first write pulse, a second write pulse, and a light emitting power. As will be obviously understood from the PWM data of FIG. 21B, the shortest mark length pattern is used as a second test pattern. That is, in the PWM data, a shortest mark having a width of one bit is arranged at the head position of one pattern length. The PWM data is "10000•••0" when it is shown by a bit pattern of the write data of FIG. 21A. When the PWM data of the shortest mark length pattern is written, one first write pulse of FIG. 21C is generated and the second write pulse of FIG. 21D is not generated. Thus, like a light emitting power of FIG. 21E, it is fundamentally an assisting power of (AP+RP) and a portion in which it is increased by only the writing power WP1 corresponding to the shortest mark length corresponding to the first write pulse exists in the middle of the light emitting power. Although "1000•••0" is used as a bit pattern in the shortest mark length pattern as a second test pattern in FIGS. 21A to 21E, a bit pattern of all 0 in which the mark length is equal to 0 can be also used. In such a bit pattern of all 0, the light emitting power to the confirmation target track corresponds to a DC light emitting pattern of the erasing power of (EP+RP). In consideration of the operation of the apparatus, the DC light emitting power in which the highest erasing power is set to an initial value is used. With respect to the case where the DC light emitting pattern of the erasing power is set to the second test pattern as well, when there is a data error in the reproduction data of the adjacent track, the erasing power EP in which there is no data error of the reproduction signal is obtained by reducing the erasing power by the specified ratio a at a time in step S10. In step S8, the other first writing power and second writing power for the erasing power EP obtained are set. In FIGS. 18A and 18B, the longest mark length pattern is first test written as a first test pattern into the whole test writing area 240. However, in the adjacent track confirming process, it is also possible to construct in a manner such that the first test pattern is test written to at least two adjacent tracks, a specified sector of one of the tracks is designated as a confirmation sector after that, the second test pattern is test written a specified number of times, and a data error of the adjacent sector is checked. Further, it is also possible to construct in a manner such that, on the contrary, the shortest mark length pattern is first test written as a first test pattern into the whole test writing area 240, a specified sector of a specified track is designated as a confirmation sector after that, the longest mark length pattern is test written as a second test pattern a specified number of times, and a data error of the adjacent sector is checked. FIGS. 20A to 20E and FIGS. 21A to 21E show the test writing by the PWM recording as examples. However, with respect to the PPM recording of FIGS. 5A to 5J as well, it is also possible to construct in a manner such that, similarly, the presence or absence of a data error of the adjacent track can be also checked by the test writing using the longest mark length pattern and the shortest mark length pattern as first and second test patterns.

Figure 22:
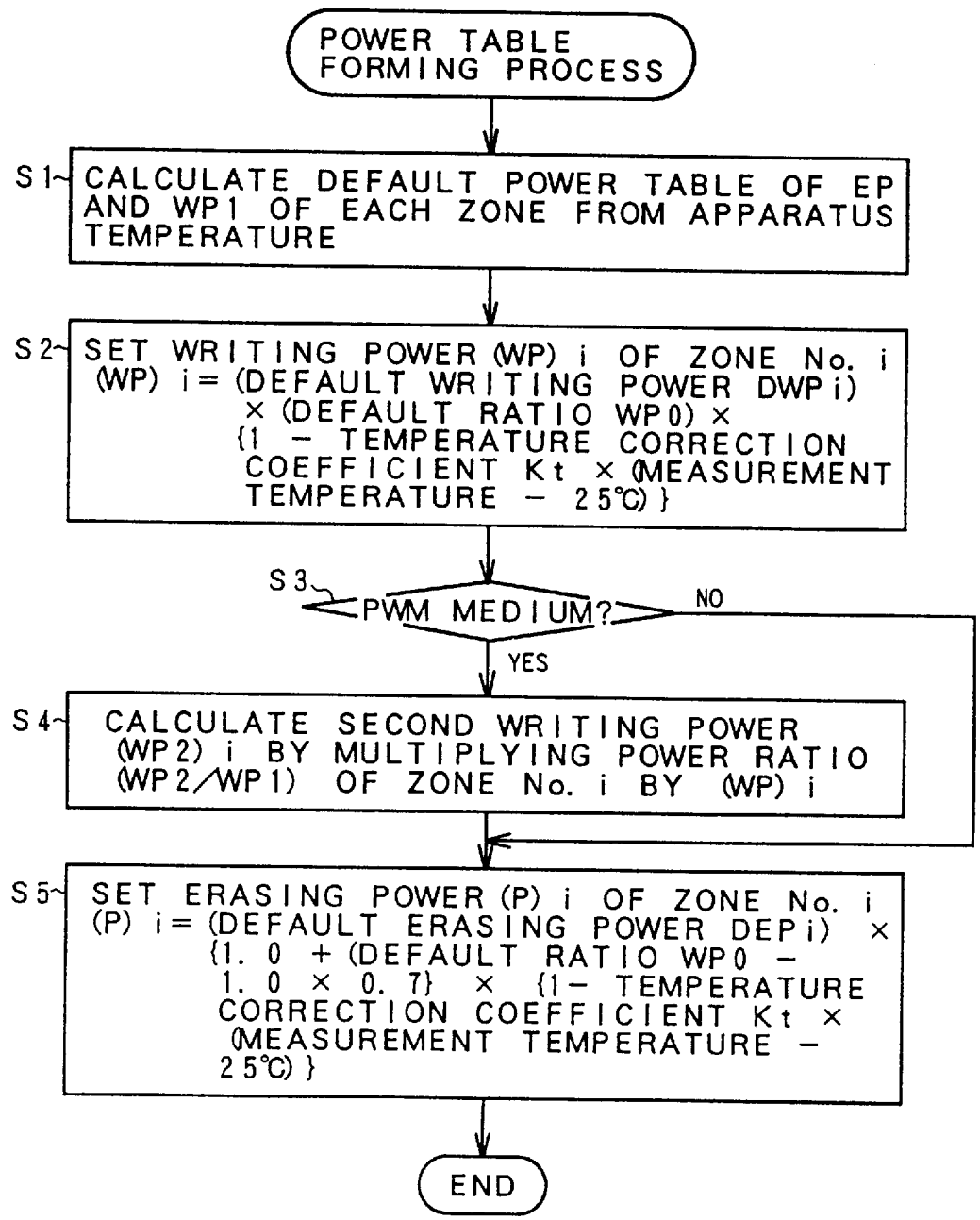
FIG. 22 is a flowchart for a power table setting process using an adjustment result of an optimum writing power.

FIG. 22 is a flowchart for a recording power setting process, namely, a power table forming process which is finally executed in step S8 in FIG. 19 after completion of the adjacent track confirming process by the test writing. A case of the MO cartridge which needs to be erased is shown as an example. In the power table forming process, a default power table of the erasing power EP and first writing power WP1 of every zone is calculated from the temperature in the apparatus in step S1. In step S2, a writing power (WP)i of the zone number (i) is set. The optimum default ratio WP0 obtained in the writing power adjustment is multiplied to a default writing power DWPi and a temperature correction is further executed, thereby calculating the writing power. In step S3, a check is made to see if the medium is a PWM medium. In case of the PWM medium, step S4 follows. A power ratio (WP2/WP1) of the zone number (i) is multiplied by a writing power (WP1)i corresponding to the first writing power obtained in step S2, thereby calculating a second writing power (WP2)i. In final step S5, an erasing power (EP)i of the zone number (i) is set. When calculating the erasing power, a value obtained by subtracting 1.0 from the default ratio WP0 of the optimum writing power derived in the writing power adjustment is multiplied by a coefficient 0.7 to suppress a fluctuation amount, 1.0 is added to a multiplication result, and a resultant value is multiplied to a default erasing power DEPi. A temperature correction by the measured temperature at that time is obviously performed. In case of the disk medium of the direct overwrite correspondence type which doesn't need to be erased, in order to set an assisting power (AP)i of the zone number (i), a value obtained by subtracting 1.0 from the default ratio WP0 of the optimum writing power derived by the writing power adjustment is multiplied by a coefficient 0.7 to suppress the fluctuation amount, a multiplication result is added to 1.0, a resultant value is multiplied by a default assisting power DAPi, and a temperature correction by the measured temperature at that time is performed. By such a power table forming process in FIG. 22, the erasing/assisting power table 218, first writing power table 220, and second writing power table 222 shown in the power table storing unit 210 in FIG. 6 are formed. The power corresponding to the zone number is read out in response to a subsequent write access from the upper apparatus and a temperature correction according to the temperature in the apparatus at that time is performed. After that, DAC instruction values for the registers in the laser diode control circuit in FIG. 3 are calculated and set, thereby performing the light emission control of the laser diode 100.

According to the invention as mentioned above, after the first test pattern was test written into the non-user area of the medium, the second test pattern is test written a specified number of times at the same position of a predetermined track by the recording power used in the test writing or by a power higher than it, and the presence or absence of the data error is discriminated from the reproduction signal at the adjacent track position. If there is no data error, such a power is set as a proper recording power. When there is the data error, the test writing is performed while reducing the recording power and the optimum recording power at which no data error is caused in the adjacent track can be set. The adjustment of the recording power when the track interval of the medium is narrowed and a high density is accomplished is optimized and the optimum recording can be realized without causing an error in the data of the adjacent track. When the data error of the adjacent track is discriminated by the test writing, by searching the optimum focal point, a data error of the adjacent track occurring when the focal point is deviated and the beam diameter increases is distinguished from the setting of the optimum power. The presence or absence of the data error of the adjacent track due to a magnitude of the recording power can be accurately discriminated.

Arbitrary modifications of the present invention are possible without the scope of the object of the invention. The present invention is not limited to the MO cartridge media and the direct overwrite correspondence type cartridge media shown in the embodiment but can be also applied to any other proper optical disk media such as a DVD and the like. Further, the invention is not limited by the numerical values shown in the embodiment.

What is claimed is:

1. An optical storage apparatus comprising:
 a laser diode to emit a light beam;
 a memory for storing an optimum recording power by adjusting a light emitting power of said laser diode;
 an adjacent track confirming unit for deciding an initial value of a recording power which is used in a test writing on the basis of said optimum recording power, sequentially test writing a first test pattern and a second test pattern to at least adjacent two tracks by a light emission driving of said laser diode by a predetermined light emitting power, subsequently reproducing the adjacent track in which said first test pattern was first test written, checking the presence or absence of a data error, and setting said light emitting power used in the test writing to a recording power when there is no substantial data error.

2. An apparatus according to claim 1, wherein said adjacent track confirming unit test writes said first test pattern to a plurality of adjacent tracks of a medium, subsequently test writes said second test pattern at a same position of a same track among said plurality of tracks a predetermined number of times, reproduces the adjacent track position where the first test pattern was first test written after that, and checks the data error.

3. An apparatus according to claim 1, wherein said adjacent track confirming unit performs the test writing in a part of a user unused area existing in an innermost or outermost rim of a medium and discriminates the presence or absence of the data error of the adjacent track.

4. An apparatus according to claim 2, further having a recording power adjusting unit for deciding an optimum recording power by adjusting the light emitting power of said light emitting diode and deciding an initial value of the recording power which is used in the test writing of said adjacent track confirming unit.

5. An apparatus according to claim 4, wherein said adjacent track confirming unit sets a recording power initial value that is slightly higher than the optimum recording power decided in said recording power adjusting unit and executes the test writing.

6. An apparatus according to claim 4, wherein said recording power adjusting unit adjusts the light emitting power of said light emitting diode and determines the optimum recording power while performing the test writing to a medium.

7. An apparatus according to claim 4, wherein said recording power adjusting unit is constructed in a manner such that while gradually reducing the recording power of said laser diode step by step, a predetermined test pattern is test written to a medium and, after that, said predetermined test pattern is reproduced and compared with an original test pattern, the number of times of dissidence of the data is counted, a recording power at which said number of times of dissidence exceeds a predetermined threshold value is detected as a lower limit recording power, and a value obtained by adding a predetermined offset to said lower limit recording power is determined as an optimum recording power.

8. An apparatus according to claim 1, wherein after the reproduction and check of the adjacent track were normally finished, said adjacent track confirming unit initialization records (erases) all of the tracks in which the test writing has been performed.

9. An apparatus according to claim 1, wherein said adjacent track confirming unit detects that a level change of a peak detection signal of an RF signal reproduced from the adjacent track is equal to or larger than a specified value, thereby determining the presence of the data error.

10. An apparatus according to claim 1, wherein said adjacent track confirming unit compares recording data and reproduction data of the adjacent track and detects that the number of bit errors is increased to a specified value or more, thereby determining the presence of the data error.

11. An apparatus according to claim 1, wherein said adjacent track confirming unit detects that the number of ECC correction errors for reproduction data of the adjacent track is increased to a specified value or more, thereby determining the presence of the data error.

12. An apparatus according to claim 1, wherein when the data error of the adjacent track is determined by the test writing, said adjacent track confirming unit repeats the test writing while gradually reducing the power to a predetermined lower limit recording power, thereby obtaining a recording power at which the data of the adjacent track doesn't cause an error.

13. An apparatus according to claim 12, wherein said adjacent track confirming unit checks the presence or absence of the data error of the adjacent track by performing the test writing at the second and subsequent times while changing a position on a medium.

14. An apparatus according to claim 12, wherein in the case where the data of the adjacent track causes an error even if the test writing is repeated by gradually reducing the power to said lower limit recording power, said adjacent track confirming unit again executes the process to obtain the recording power from the beginning by performing the test writing again at a different position on a medium.

15. An apparatus according to claim 14, wherein when the process to obtain the recording power is again executed from the beginning, said adjacent track confirming unit searches an optimum focal point and optimizes an offset value of an automatic focal point control and, after that, again executes said process.

16. An apparatus according to claim 15, wherein when a position of an objective lens is adjusted, said adjacent track confirming unit sets an offset value which gives a lens position where a tracking error signal detected from return light of the medium is maximum to an optimum focal point.

17. An apparatus according to claim 13, wherein when a position of an objective lens is adjusted, said adjacent track confirming unit sets an offset value which gives a lens position where an RF reproduction signal detected from return light of the medium is maximum to an optimum focal point.

18. An apparatus according to claim 15, wherein when a position of an objective lens is adjusted, said adjacent track confirming unit sets an offset value which gives a lens position where a sum signal of a 4-split detector to convert return light of the medium into an electric signal is maximum to an optimum focal point.

19. An apparatus according to claim 1, wherein said adjacent track confirming unit test writes a longest mark length pattern as said first test pattern to all tracks in a test area of a medium.

20. An apparatus according to claim 19, wherein said adjacent track confirming unit designates a specified sector position of a specified track in the test area of the medium in which said longest mark length pattern has been test written, and test writes a shortest mark length pattern as said second test pattern a specified number of times.

21. An apparatus according to claim 19, wherein said adjacent track confirming unit designates a specified sector position of a specified track in the test area of the medium in which said longest mark length pattern has been test written, and test writes a DC light emitting pattern in which a highest power on the operation of the apparatus is set to an initial value as said second test pattern a specified number of times.

22. An apparatus according to claim 1, wherein when a change in temperature in the apparatus is equal to or larger than a specified value, said adjacent track confirming unit performs the test writing and resets the recording power.

23. An apparatus according to claim 1, wherein said adjacent track confirming unit monitors an elapsed time from a previous test writing, again performs the test writing after the elapse of a predetermined test write valid time, and resets the recording power.

24. An apparatus according to claim 1, wherein said adjacent track confirming unit performs the test writing by an instruction from an upper apparatus and resets the recording power.

25. An apparatus according to claim 1, wherein said adjacent track confirming unit resets the recording power by the test writing while changing every time a position on a medium to b e test written.

26. An optical storage apparatus comprising:
a laser diode to emit a light beam;
a memory for storing an optimum recording power by adjusting a light emitting power of said laser diode;
an adjacent track confirming unit for deciding an initial value of a recording power which is used in a test writing on the basis of said optimum recording power, sequentially test writing a first test pattern to a center track and a second test pattern to two tracks on both sides among at least three adjacent tracks by a light emission driving of said laser diode by a predetermined light emitting power, subsequently reproducing the adjacent track in which said first test pattern was first test written, checking the present or absence of a data error, and setting said light emitting power used in the test writing to a recording power when there is no substantial data error.

27. An apparatus according to claim 26, wherein said adjacent track confirming unit test writes said first test pattern to a plurality of adjacent tracks of a medium, subsequently test writes said second test pattern at a same position of a same track among said plurality of tracks a predetermined number of times, reproduces the adjacent track position where the first test pattern was first test written after that, and checks the data error.

28. An apparatus according to claim 26, wherein said adjacent track confirming unit performs the test writing in a part of a user unused area existing in an innermost or outermost rim of a medium and discriminates the presence or absence of the data error of the adjacent track.

29. An apparatus according to claim 27, further having a recording power adjusting unit for deciding an optimum recording power by adjusting the light emitting power of said light emitting diode and deciding an initial value of the recording power which is used in the test writing of said adjacent track confirming unit.

30. An apparatus according to claim 29, wherein said adjacent track confirming unit sets a recording power initial value that is slightly higher than the optimum recording power decided in said recording power adjusting unit and executes the test writing.

31. An apparatus according to claim 29, wherein said recording power adjusting unit adjusts the light emitting power of said light emitting diode and determines the optimum recording power while performing the test writing to a medium.

32. An apparatus according to claim 29, wherein said recording power adjusting unit is constructed in a manner such that while gradually reducing the recording power of said laser diode step by step, a predetermined test pattern is test written to a medium and, after that, said predetermined test pattern is reproduced and compared with an original test pattern, the number of times of dissidence of the data is counted, a recording power at which said number of times of dissidence exceeds a predetermined threshold value is detected as a lower limit recording power, and a value obtained by adding a predetermined offset to said lower limit recording power is determined as an optimum recording power.

33. An apparatus according to claim 26, wherein after the reproduction and check of the adjacent track were normally finished, said adjacent track confirming unit initialization records (erases) all of the tracks in which the test writing has been performed.

34. An apparatus according to claim 26, wherein said adjacent track confirming unit detects that a level change of a peak detection signal of an RF signal reproduced from the adjacent track is equal to or larger than a specified value, thereby determining the presence of the data error.

35. An apparatus according to claim 26, wherein said adjacent track confirming unit compares recording data and reproduction data of the adjacent track and detects that the number of bit errors is increased to a specified value or more, thereby determining the presence of the data error.

36. An apparatus according to claim 26, wherein said adjacent track confirming unit detects that the number of ECC correction errors for reproduction data of the adjacent track is increased to a specified value or more, thereby determining the presence of the data error.

37. An apparatus according to claim 26, wherein when the data error of the adjacent track is determined by the test writing, said adjacent track confirming unit repeats the test writing while gradually reducing the power to a predetermined lower limit recording power, thereby obtaining a recording power at which the data of the adjacent track doesn't cause an error.

38. An apparatus according to claim 37, wherein said adjacent track confirming unit checks the presence or absence of the data error of the adjacent track by performing the test writing at the second and subsequent times while changing a position on a medium.

39. An apparatus according to claim 37, wherein in the case where the data of the adjacent track causes an error even if the test writing is repeated by gradually reducing the power to said lower limit recording power, said adjacent track confirming unit again executes the process to obtain the recording power from the beginning by performing the test writing again at a different position on a medium.

40. An apparatus according to claim 39, wherein when the process to obtain the recording power is again executed from the beginning, said adjacent track confirming unit searches an optimum focal point and optimizes an offset value of an automatic focal point control and, after that, again executes said process.

41. An apparatus according to claim 40, wherein when a position of an objective lens is adjusted, said adjacent track confirming unit sets an offset value which gives a lens position where a tracking error signal detected from return light of the medium is maximum to an optimum focal point.

42. An apparatus according to claim 38, wherein when a position of an objective lens is adjusted, said adjacent track confirming unit sets an offset value which gives a lens position where an RF reproduction signal detected from return light of the medium is maximum to an optimum focal point.

43. An apparatus according to claim 40, wherein when a position of an objective lens is adjusted, said adjacent track confirming unit sets an offset value which gives a lens position where a sum signal of a 4-split detector to convert return light of the medium into an electric signal is maximum to an optimum focal point.

44. An apparatus according to claim 26, wherein said adjacent track confirming unit test writes a longest mark length pattern as said first test pattern to all tracks in a test area of a medium.

45. An apparatus according to claim 44, wherein said adjacent track confirming unit designates a specified sector position of a specified track in the test area of the medium in which said longest mark length pattern has been test written, and test writes a shortest mark length pattern as said second test pattern a specified number of times.

46. An apparatus according to claim 44, wherein said adjacent track confirming unit designates a specified sector position of a specified track in the test area of the medium in which said longest mark length pattern has been test written, and test writes a DC light emitting pattern in which a highest power on the operation of the apparatus is set to an initial value as said second test pattern a specified number of times.

47. An apparatus according to claim 26, wherein when a change in temperature in the apparatus is equal to or larger than a specified value, said adjacent track confirming unit performs the test writing and resets the recording power.

48. An apparatus according to claim 26, wherein said adjacent track confirming unit monitors an elapsed time from a previous test writing, again performs the test writing after the elapse of a predetermined test write valid time, and resets the recording power.

49. An apparatus according to claim 26, wherein said adjacent track confirming unit performs the test writing by an instruction from an upper apparatus and resets the recording power.

50. An apparatus according to claim 26, wherein said adjacent track confirming unit resets the recording power by the test writing while changing every time a position on a medium to be test written.

* * * * *